(12) United States Patent
Fujii et al.

(10) Patent No.: US 7,088,353 B2
(45) Date of Patent: Aug. 8, 2006

(54) DISPLAY DEVICE

(75) Inventors: Takeshi Fujii, Kanagawa (JP); Yoji Okazaki, Kanagawa (JP); Kazuhiko Nagano, Kanagawa (JP); Koichi Kimura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 418 days.

(21) Appl. No.: 10/616,290

(22) Filed: Jul. 10, 2003

(65) Prior Publication Data

US 2004/0104902 A1    Jun. 3, 2004

(30) Foreign Application Priority Data

Jul. 10, 2002   (JP)   .............................. 2002-201736

(51) Int. Cl.
*G09G 5/00* (2006.01)
(52) U.S. Cl. ........................ 345/204; 359/649; 359/618
(58) Field of Classification Search ................ 345/204, 345/55; 359/618, 619, 649
See application file for complete search history.

(56) References Cited

U.S. PATENT DOCUMENTS

| | | | | |
|---|---|---|---|---|
| 5,768,028 | A | * | 6/1998 | Okamura ..................... 359/662 |
| 5,892,556 | A | * | 4/1999 | Deter .......................... 348/739 |
| 5,982,553 | A | * | 11/1999 | Bloom et al. ................ 359/627 |
| 6,433,934 | B1 | * | 8/2002 | Reznichenko et al. ...... 359/622 |
| 6,469,772 | B1 | * | 10/2002 | Itabashi ....................... 355/47 |
| 6,542,245 | B1 | * | 4/2003 | Toida .......................... 356/480 |
| 2003/0161046 | A1 | * | 8/2003 | Kawamura et al. ......... 359/619 |
| 2003/0189742 | A1 | * | 10/2003 | Kobayashi .................. 359/202 |

FOREIGN PATENT DOCUMENTS

JP    2002-131838 A    5/2002

* cited by examiner

*Primary Examiner*—Kent Chang
(74) *Attorney, Agent, or Firm*—Sughrue Mion, PLLC

(57) ABSTRACT

In order to provide a display device by which increasing of number of spatial light modulation elements and increasing of number of pixels can be suppressed, and high definition of a display image is easily realized, in the display device, a DMD is inclined with respect to a sub scanning direction by very small inclining-angle, and this inclining-angle is set in accordance with a scanning density of a light beam in a main scanning direction on the surface to be scanned.

19 Claims, 21 Drawing Sheets

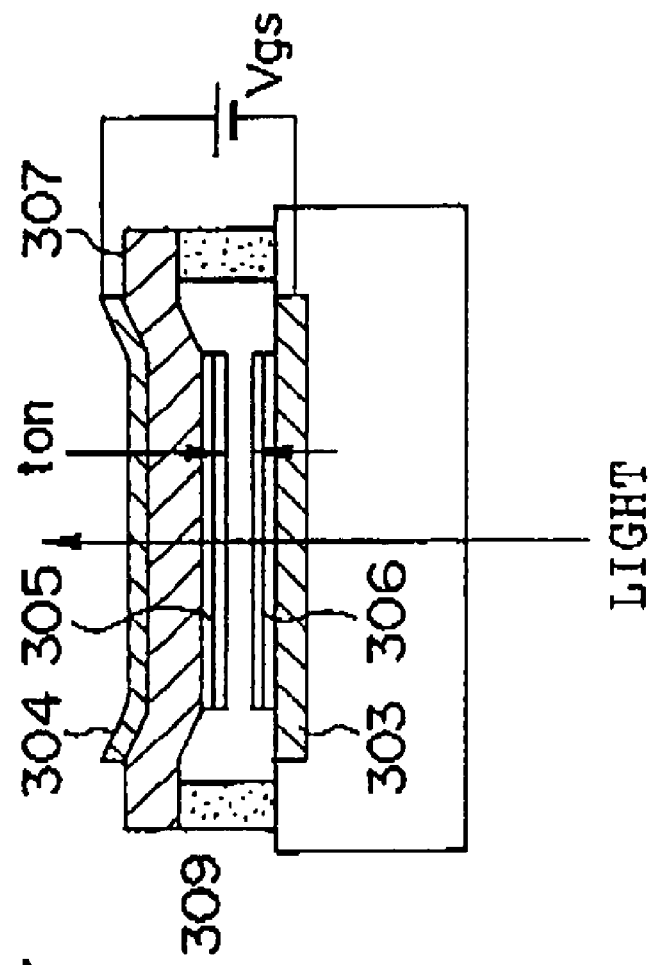
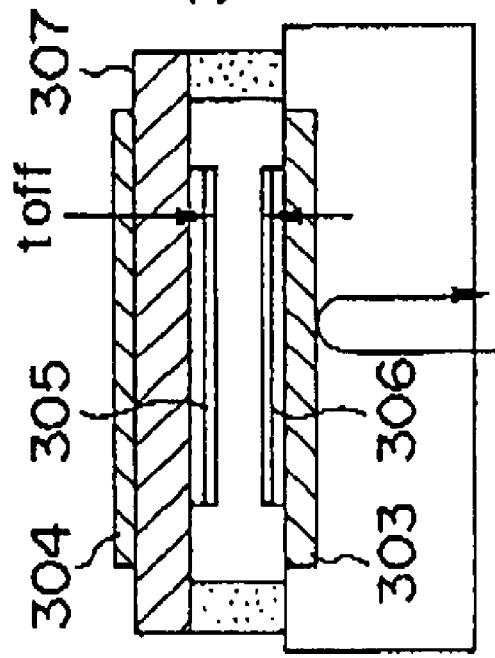
FIG. 19A (POWER OFF)
FIG. 19B (POWER ON)

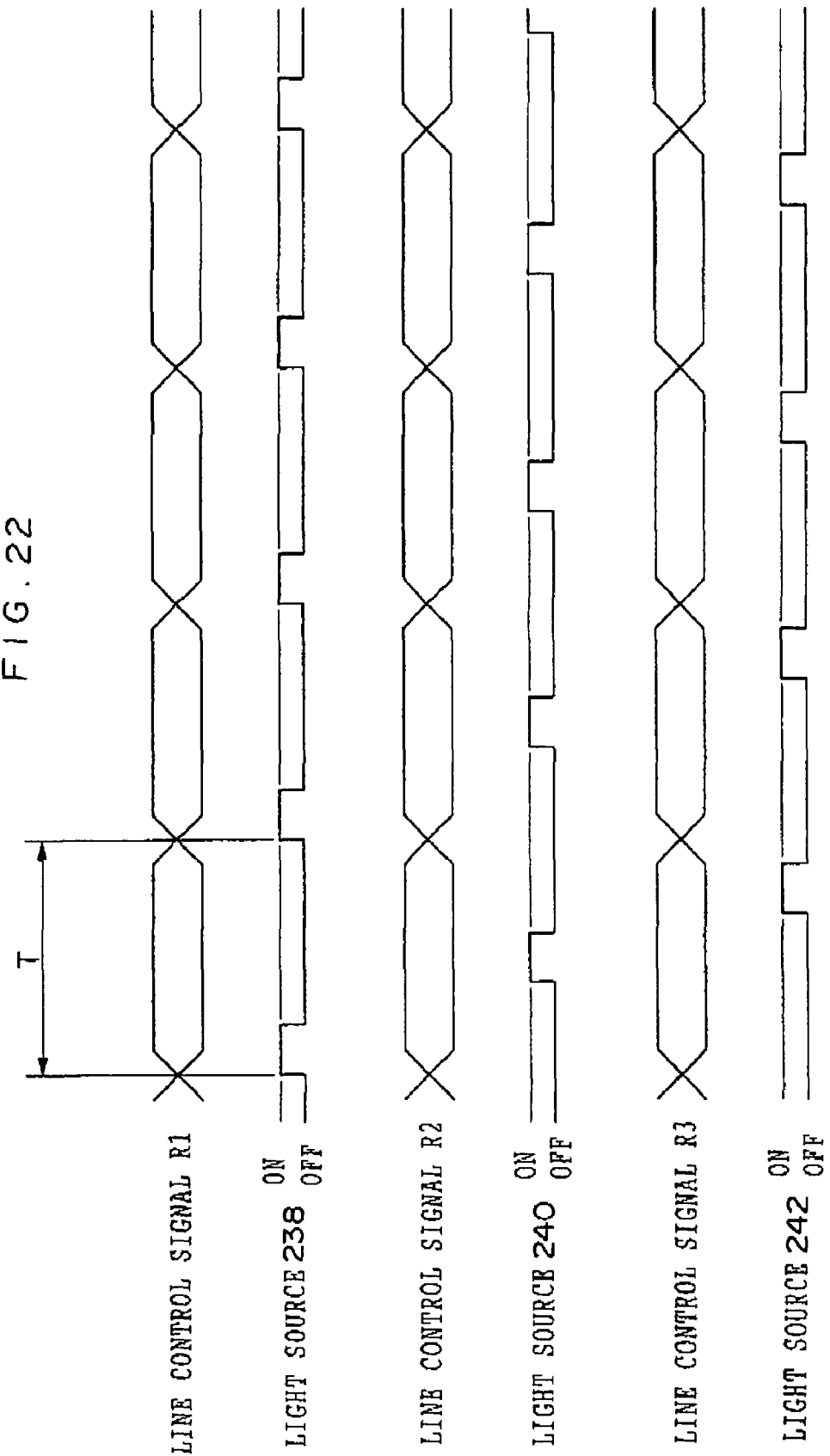

DISPLAY DEVICE

CROSS-REFERENCE TO RELATED APPLICATION

This application claims priority under 35 USC 119 from Japanese Patent Application No. 2002-201736, the disclosure of which is incorporated by reference

BACKGROUND OF THE INVENTION

1. Field of the Invention

The present invention relates to a display device, and in particular, to a display device which scans an image display body such as a screen, a display panel or the like with a light beam modulated in accordance with an image signal and displays an image on the image display body.

2. Description of the Related Art

As conventional laser display devices, for example, devices (1)–(3) described below have been known.

(1) A device in which, one laser beam is modulated in accordance with image signal by a light modulation element, and this laser beam is deflected along a main scanning direction and a sub scanning direction, thereby, an image display body such as a display panel or the like is scanned with this laser beam and an image is displayed on the image display body.

(2) A device in which, laser beams are modulated in accordance with image signals by an one-dimensional spatial light modulation element in which a plurality of pixel portions are arranged in a line manner, and a set of the laser beams which are arranged in a line manner are deflected along a direction (a sub scanning direction) orthogonal to an arrangement direction (a main scanning direction), thereby, an image display body such as a screen or the like is scanned with this set of the laser beams and an image is displayed on the screen. (for example, refer a Japanese Patent Laid-Open No. 2000-131838)

(3) A device in which, laser beans are modulated in accordance with image signals by an two-dimensional spatial light modulation element in which a plurality of pixel portions are arranged in a two dimensional manner, thereby, a large number (a number of display-pixels) of the laser beams which are arranged in a two dimensional manner are image-formed on an image displayed body by respective image-forming systems and an image is displayed.

In the laser display devices mentioned above, generally, increasing of a number of display-pixels is necessary in order that a display image is made high definition. This will be described hereinafter concretely. For example, when considering in a case in which a monochrome image of pixels (10000×7500) is drawn (image-formed) in sixty frames per second. In a case of the laser display device (1) mentioned above, it is impossible as a matter of fact that the laser beam is modulated in accordance with the image signal by one light modulation element. Because a modulation frequency of the light modulation element is about 4.5 GHz, that is, it is very high speed (rate).

Further, in a case of the laser splay device (2) mentioned above, regarding a number of the pixels of the one-dimensional spatial light modulation element necessary to modulate the laser beams, at least 7500 pixels are necessary. On the other hand, it is general that a number of the pixels of the one-dimensional spatial light modulation element is about 1000 pixels at the most. Accordingly, in the case of the laser display device (2), many numbers of (more than or equal to eight) the one-dimensional spatial light modulation elements are necessary. In such a case, it is difficult to manufacture the device in low cost. Further, image quality deterioration (liner defect) caused by pixel defect of the one-dimensional spatial light modulation element may often occur.

Further, in a case of the last display device (3) mentioned above, at least 10000×7500 pixels are necessary regarding a number of the pixels of the two-dimensional spatial light modulation element necessary to modulate the laser beams. Therefore, in the case in which a plurality of the two-dimensional spatial light modulation elements are used to modulate the laser beams, problems which basically are the same as those in the case of the laser display device (2) arise. Further, in a case in which the two-dimensional spatial light modulation element whose number of pixels are 10000×7500 is manufactured, numerical quantity of devices (spatial light modulation elements) obtained from an one wafer becomes extremely small due to yield becoming low because of increasing of rate of occurrence of pixel defect and size of the device being large. As the result, the cost of the device becomes very high. Therefore, manufacturing cost of the laser display device using such the two-dimensional spatial light modulation element becomes also high.

Next, the result of studying a case in which animation (moving image) is displayed by the laser display device mentioned above will be explained. For example, in a case in which an image modulation period of an one image (frame) in a display device having a resolution of 10000 pixels in a sub scanning direction and 7500 pixels in a main scanning direction is calculated, a frame rate of at least 30 frames per second is required in order that flicker is not perceived and smooth animation is displayed. Normally, a frame rate of about 60 frames per second is required. Accordingly, in order to obtain frame rate of 60 frames per second, modulation period of a display image is "one second/30=16.7 ms". Further in the case in which a resolution in a sub scanning direction is 10000 pixels, and assuming scanning efficiency of a scanning device such as a galvano mirror is 80%, modulation period per one pixel is "0.0167*0.8/10000=1.3 μs". It is difficult to modulate pixel in accordance with image signal within such a short period by a general spatial light modulation element.

SUMMARY OF THE INVENTION

The present invention was developed by consideration of the above mentioned problems, and an object of the present invention is to provide a low-cost display device by which increasing of number of spatial light modulation elements and increasing of number of pixels can be suppressed, and high definition of a display image is easily realized.

Further, an object of the present invention is to provide a display device by which an image can be displayed with a frame rate which is faster than a frame rate obtained from inherent pixel modulation period of a spatial modulation element while high definition of a display image can also be realized.

A first aspect of the present invention is a display device comprising a light source section which emits a light beam; a spatial (space) light modulation element in which a plurality of pixel portions, each of whose state related to light modulation is changed in accordance with an image signal, are arranged in a two dimensional manner, and which modulates, every each pixel portion, the light beam incident to the plurality of pixel portions from the light source; a pixel size adjustment section included in an image forming optical system for imaging the light beam, in which a plurality of beam reduction portions are arranged in a two dimensional manner correspondingly to the plurality of pixel portions, a diameter of the light beam modulated by the pixel portion being reduced by the beam reduction portion corresponding to the pixel portion modulating the light beam; and a scanning section, by deflecting (polarizing) a group of the light beams whose diameters are reduced by the pixel size adjustment section in a sub scanning direction, which scans a surface to be scanned of an image display body with the group of the light beams, wherein the plurality of pixel portions are arranged along a column direction and a row direction corresponding to the sub scanning direction and a main scanning direction orthogonal to the sub scanning direction respectively, at least the column direction being inclined with respect to the sub scanning direction by a predetermined inclining-angle, and the inclining-angle is set in accordance with a scanning density of the light beam in the main scanning direction on the surface to be scanned.

In a second a of the present invention according to the first aspect, the inclining-angle is set such that light beams modulated by a plurality of the pixel portions are scanned on the same position on the surface to be scanned.

In the third and the fourth aspects of the present invention according to the first and second aspects, the light source section comprises a red laser light source device which emits a red laser beam, a green laser light source device which emits a green laser beam, and a blue laser light source device which emits a blue laser beam, and the red laser beam, the green laser beam, and the blue laser beam, emitted from the red laser light source device, the green laser light source device, and the blue laser light source device, respectively, are modulated by a plurality of spatial light modulation elements, respectively.

In the fifth and the sixth aspects of the present invention according to the first and second aspects, the light source section is a laser light source device, in which GaN semiconductor laser is used as a light source of the laser light source device, and which emits a laser beam whose wavelength is in 400 nm band, and an emission type screen, provided with a luminophor (a fluorophor), which displays an image, is used as the image display body, the luminophor emitting a white light by the laser beam whose wavelength is in 400 nm band being irradiated thereon.

In the seventh and the eighth aspects of the present invention according to the first and second aspects, the light source section is a laser light source device, in which GaN semiconductor laser is used as a light source of the laser light source device, and which emits a laser beam whose wavelength is in 400 nm band and a luminophor type screen, provided with a red luminophor, a green luminophor, and a blue luminophor at each display pixel, is used as the image display body, the red luminophor emitting a red light, the green luminophor emitting a green light, and the blue luminophor emitting a blue light, by the laser beam whose wavelength is in 400 nm band being irradiated thereon.

In the ninth and the tenth aspects of the present invention according to the first and second aspects, the spatial light modulation element is a two dimensional spatial light modulation element in which a plurality of pixel portions enabling light modulation are arranged in a two dimensional manner, and the light beam emitted from the light source section is modulated by using only a part of the pixel portions of the two dimensional spatial light modulation element.

In the eleventh and the twelfth aspects of the present invention according to the first and second aspects, the spatial light modulation element is a digital micro mirror device in which a plurality of micro mirrors, each of whose angle of a reflection surface is changable in accordance with an image signal, are arranged in a two dimensional manner on a substrate thereof, and the light beam emitted from the light source section is modulated by using only a part of the micro mirror of the digital micro mirror device.

In the thirteenth and the fourteenth aspects of the present invention according to the first and second aspects, the spatial light modulation element is an optical shutter array in which interference type optical shutters are arranged in a two dimensional manner, the interference type optical shutter comprising: an one of electrodes, disposed to have a predetermined angle with respect to the light beam incident thereto from the light source section, another of the electrodes, which faces the one of the electrodes, and a flexible thin plate which is disposed between the other of the electrodes and the one of the electrodes, and which is transparent, wherein the flexible thin plate is deformed due to coulomb force generated by applying voltage between the other of the electrodes and the one of the electrodes, and the light beam is modulated by one of the light beam being transmitted through the flexible in plate or the light beam being reflected by the flexible thin plate.

A fifteenth aspect of the present invention is a display device comprising: a light source section which emits a light beam; a spatial light modulation element in which a plurality of pixel portions changed in accordance with an image signal, are arranged in a two dimensional manner, and which modulates, every each pixel portion, the light beam incident to the plurality of pixel portions from the light source; an image forming optical system for imaging the light beam; and a scanning section, which scans a surface to be scanned of an image display body with the light beam modulated by the spatial light modulation element, wherein the plurality of pixel portions are arranged along a column direction and a row direction corresponding to the sub scanning direction and a main a scanning direction orthogonal to the sub scanning direction respectively, at least the column direction being inclined with respect to the sub scanning direction by a predetermined inclining-angle, the inclining-angle is set in accordance with a scanning density of the light beam in the main scanning direction on the surface to be scanned, and the inclining-angle is set such that the light beams modulated by a plurality of the pixel portions are scanned on the same position on the surface to be scanned.

In the sixteenth aspect of the present invention according to the fifteenth aspect, the spatial light modulation element itself is inclined with respect to the sub scanning direction by the predetermined inclining angle.

In the seventeenth aspect of the present invention according to the fifteenth aspect, in the spatial light modulation element, the plurality of the pixel portions are arranged such that each of pixel lines, each having pixel portions arranged along the row direction, is shifted in the row direction by a predetermined pitch.

In the display device mentioned above, the plurality of pixel portions of the spatial light modulation element are arranged along the column direction and the row direction corresponding to the sub scanning direction and the main scanning direction respectively in a line manner. Further, at least the column direction is inclined with respect to the sub scanning direction by the predetermined inclining-angle $\theta_I$, and the inclining-angle $\theta_I$ is set in accordance with the scanning density of the light beam in the main scanning direction on the surface to be scanned. Accordingly, in a case in which j pixel portions are arranged along the row direction corresponding to the main scanning direction and k pixel portions are arranged along the column direction corresponding to the sub scanning direction on the spatial light modulation element, each of positions, which are different from each other, on the same scanning line on the surface to be scanned can be scanned with N multiple of j (j×N) laser beams (N is a positive integer, N≦k) in accordance with the inclining-angle $\theta_I$ between the column direction and the sub scanning direction. Therefore, by adjusting properly the inclining-angle $\theta_I$ of the column direction of the pixel portions, a pixel density of an image (displayed image) displayed on a display space of the image display body can be increased to a desired density value.

As the result, (in a display device using an one-dimensional spatial light modulation element, it is necessary to increase an installation number of the one-dimensional spatial light modulation elements in accordance with increasing of the scanning density of a display image,) in the display device of the present invention, it is not necessary to increase an installation number of the spatial light modulation elements. Further, in the present invention, an image having the desired pixel density can be displayed by only setting the inclining-angle $\theta_I$ of the column direction of the pixel portions in accordance with the desired number of pixels, without increasing of number of the spatial light modulation elements (two-dimensional spatial light modulation elements) and increasing of number of pixels.

Here, the column direction in the plurality of pixel portions in the spatial light modulation element being inclined with respect to the sub scanning direction by the predetermined inclining-angle $\theta_I$ is archived by that the spatial light modulation element itself is inclined with respect to the sub scanning direction by the predetermined inclining-angle $\theta_I$. Further, it can be archived by that the plurality of pixel portions in the spatial light modulation element are arranged in a zigzag manner. That is, a plurality of pixel portions arranged along the row direction (a column) is shifted in the row direction by a predetermined pitch at every column.

Further, as the spatial light modulation element (two-dimensional spatial light modulation element), a digital micro mirror device in which a plurality of micro mirrors, each of whose angle of a reflection surface is changable in accordance with an image signal, are arranged in a two dimensional manner on a substrate thereof, an optical shutter array in which interference type optical shutter are arranged in a two dimensional manner, the interference type optical shutter comprising an one of electrodes, disposed to have a predetermined angle with respect to the light beam incident thereto from the light source section, another of the electrodes, which faces the one of the electrodes, and a flexible thin plate which is disposed between the other of the electrodes and the one of the electrodes, and which is transparent, the flexible thin plate being deflected due to coulomb force generated by applying voltage between the other of the electrodes and the one of the electrodes, and the light beam being modulated by the light beam being transmitted through the flexible thin plate, or the like can be used. Particularly, in a case in which the digital micro mirror device is used as the spatial light modulation element, in order for shortening a transmitting rate of image signal with respect to the digital micro mirror device, the light beam emitted from the light source section can be modulated by using only a part of the micro mirrors of the digital micro mirror device.

Further, in the display device of the present invention, in a case in which the inclining-angle $\theta_I$ of the pixel portions in the column direction is set such that the same position on the surface to be scanned is scanned by a plurality (N) of pixel portions, the same position (the same pixel) in the main scanning direction on the same scanning line on the surface to be scanned on the image display body can be scanned N times (that is, multi scanned) by laser beams modulated by N pixel portions each of which is arranged in different columns in the spatial light modulation element. Therefore, even if some of the pixel portions in the spatial light modulation element have defect, an image quality degradation of the display image caused by defect of the pixel portion can become non-conspicuous.

In an eighteenth aspect of the present invention according to the first or the second aspect, the display device further comprises: an image control section which generates image signals of N types, N being integer more than or equal to two, corresponding respectively to N different displayed regions along the sub scanning direction in the surface to be scanned of the image display body, and varies (controls) respectively light modulated states of N spatial light modulation elements in accordance with the image signals of N types, and the light beams emitted from the light source seconds are respectively irradiated to the N spatial light modulation elements, a set of N light beams modulated respectively by the N spatial light modulation elements is deflected (polarized) in the sub scanning direction by the scanning section, and the N displayed regions on the surface to be scanned are scanned respectively by the set of N light beams at the same time.

In the display device of the eighteenth aspect, the light beams emitted from the light source sections are respectively irradiated to the N spatial light modulation elements whose light modulated states are varied in accordance with the image signals of N types respectively. N light beams (actually, light beam groups each as a set of the light beams modulated in each pixel portion) modulated respectively by the N spatial light modulation elements are deflected in the sub scanning direction by the scanning section the N displayed regions on the surface to be scanned are scanned respectively by the set of the N light beams at the same time. As a result, the number of display pixels along the subscanning direction included in one of the display regions scanned by the corresponding laser beam modulated by any one of the spatial light modulation element among the N spatial light modulation element becomes substantially 1/N the entire number of display pixels along the subscanning direction included in the surface to be scanned. Therefore, the number of modulating times (control times) per unit time with respect to the pixel portions used in modulating the light beam in the one spatial light modulation element becomes substantially 1/N in comparison to the case where an image is displayed on the entire surface to be scanned using only the single spatial light modulation element. Therefore, each pixel modulation period of the pixel portion of each spatial light modulation element can be substantially N times in average respectively.

In a nineteenth aspect of the present invention according to the first or the second aspect, the display device of claim 1 further comprises: an image control section which generates line image signals of M types, M being integer more than or equal to two, corresponding respectively to M main scanning lines arranged along the sub scanning direction successively, the main scanning lines forming the displayed image displayed on the surface to be scanned of the image display body, and varies (controls) respectively light modulated states of pixel portions arranged along the main scanning direction in the M spatial light modulation elements in accordance with the line image signals of M types with a modulating period T which is obtained by a modulating period $T_L$ of the main scanning line being multiplied by M, the light beams emitted from the light source sections in a strobo-emission manner in synchronization with the modulating period T are respectively irradiated to the M spatial light modulation elements successively, and a set of light beams modulated successively by the M spatial light modulation elements is deflected (polarized) in the scanning direction by the scanning section, and the surface to be scanned of the image display body is scanned by the set of the light beams.

In the display device of the nineteenth aspect, the light beams emitted from the light source sections in a strobo-emission manner in synchronization with the modulating period are respectively irradiated to the M spatial light modulation elements successively, a set of the light beams, modulated successively by the pixel portions whose light modulated states are varied (changed), the pixel portions being arranged along the main scanning direction in the M spatial light modulation elements, in accordance with the line image signals of M types with a modulating period T which is obtained by a modulating period $T_L$ of the main scanning line being multiplied by M, is deflected in the sub scanning direction by the scanning section. The surface to be scanned of the image display body is scanned by the set of the light beams. As a result because the set of the light beams modulated by the M spatial light modulation elements scans the surface to be scanned of the image display body to form the image at a timing shifted by the modulating period $T_L$ respectively, the pixel modulating period of the pixel portions arranged along the subscanning direction each spatial light modulation element can be M times in average in comparison to the case where an image is displayed on the entire surface to be scanned using only the single spatial light modulation element.

BRIEF DESCRIPTION OF THE DRAWINGS

FIG. 19A is a cross sectional view of line A—A in FIG. 17 in a case of power OFF.

FIG. 19B is a cross sectional view of line A—A in FIG. 17 in a case of power ON.

FIG. 22 is a timing chart showing a line control signal and emission timing of a fiber array light source in the laser display device shown in FIG. 21.

DETAILED DESCRIPTION OF THE INVENTION

Referring to drawings, an embodiment of the present invention will be described hereinafter in detail.

Structure of Exposure Device (A First Embodiment)

(Structure of Laser Display Device)

Figure 1:
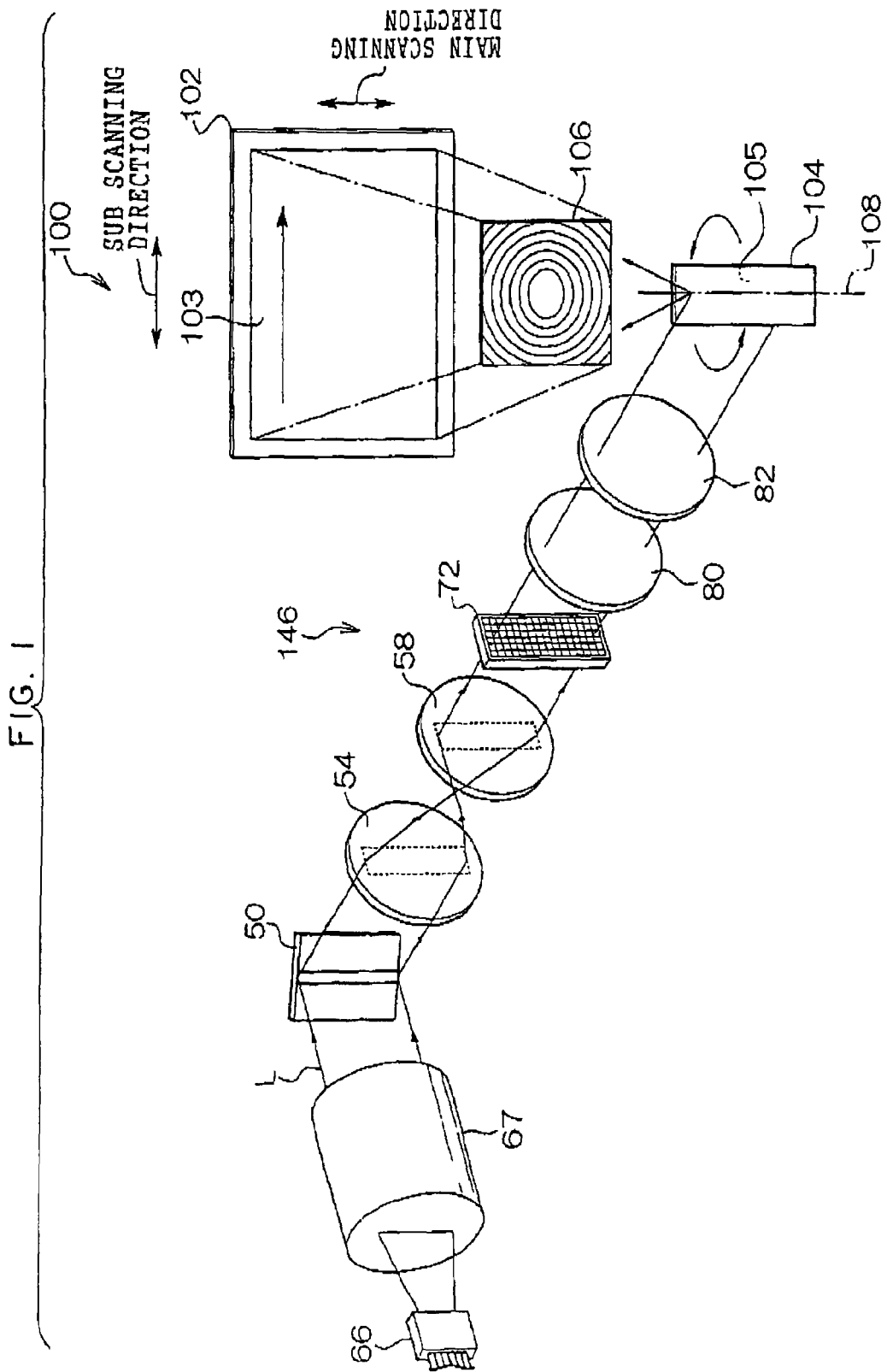
FIG. 1 is a perspective view illustrating the structure of a laser display device related to a first embodiment of the present invention.
Figure 2:
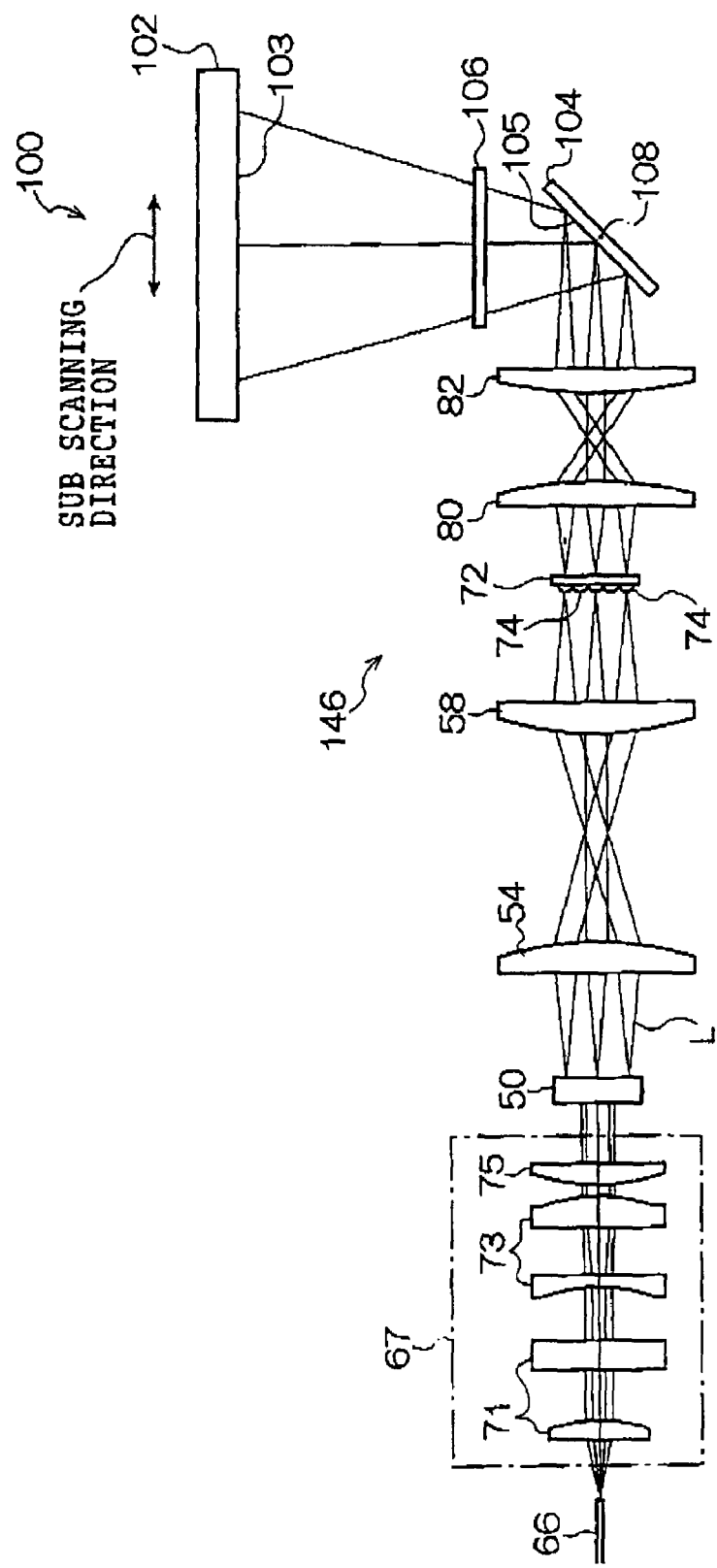
FIG. 2 is a plane view illustrating the structure of the laser display device related to the first embodiment of the present invention.
Figure 3:
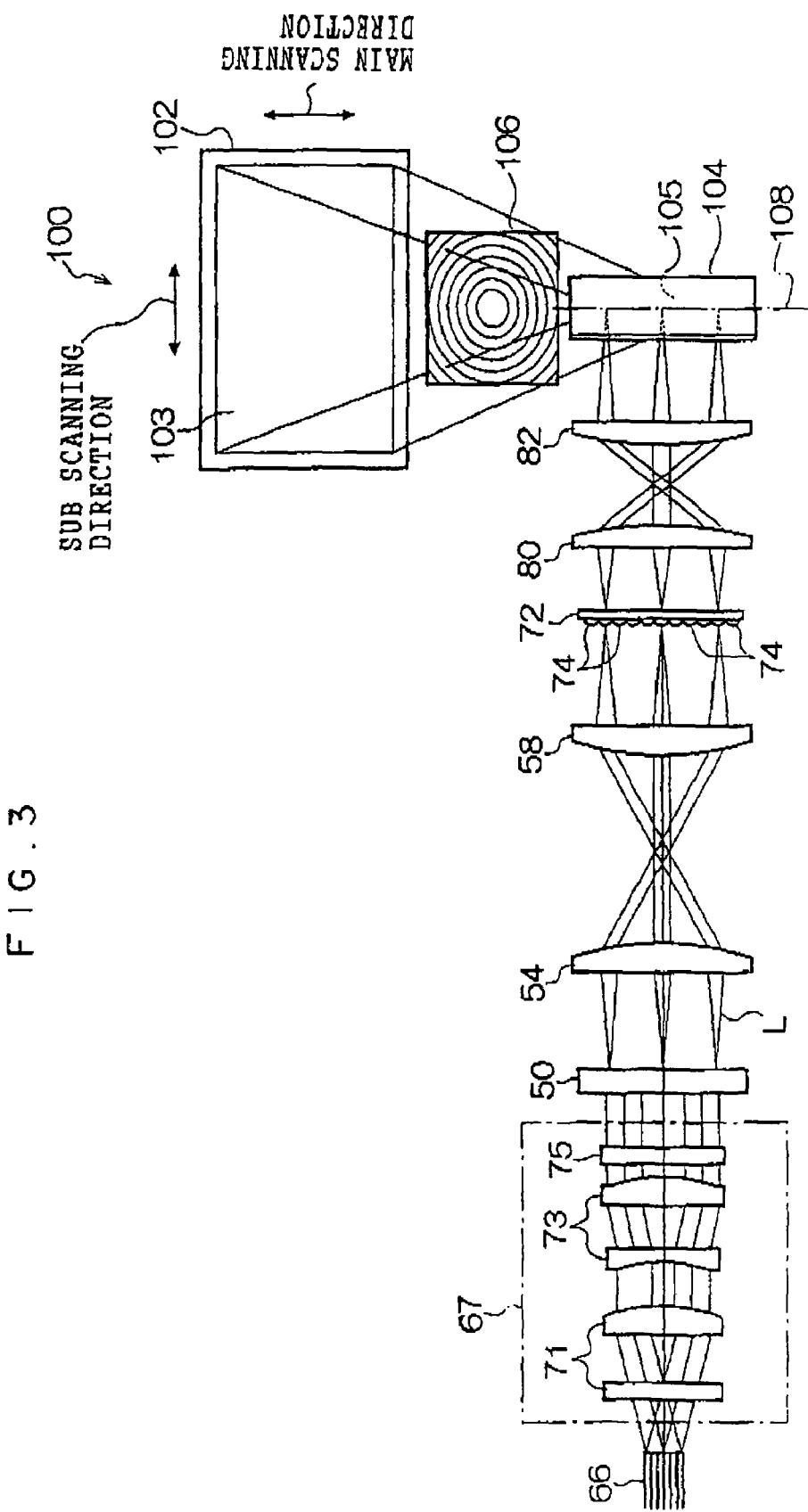
FIG. 3 is a side view illustrating the structure of the laser display device related to the first embodiment of the present invention.

In each of FIGS. 1, 2 and 3, a laser display device related to a first embodiment of the present invention is shown. The laser display device 100 is constructed as a projector type device for which a monochrome image is projected and displayed on an image display surface 103 of a screen 102, by the image display surface 103 of the screen 102 being directly scanned by a laser beam L.

As shown in FIG. 1, the laser display device 100 is provided with a fiber array light source 66 which serves as a light source device of the laser beam L. On an optical path of the laser beam L emitted from the fiber array light source 66, an illumination optical system 67, a digital micro mirror device (DMD) 50, an imaging (image forming) optical system 146, a galvano mirror 104, and a Fresnel lens 106 are disposed in that order from the fiber array light source 66 side.

The laser display device 100 is provided with a controller (not shown in the drawings). The controller, receives a control signal and an image signal from a central control section and the like of the device, and controls an operation of image display. The galvano mirror 104, the DMD 50 and the like are controlled by the controller. The controller is provided with a data processing section and a mirror drive control section. The data processing section generates control signals which control to drive micro mirrors 62 (refer to FIG. 10) on the basis of the inputted image data. These controlled micro mirrors 62 are disposed in a region to be controlled in the DMD 50. Note that the region to be controlled in the DMD 50 will be described later. Further, in the mirror drive control section, an angle of a reflection surface of each of the micro mirrors 62 disposed in the region to be controlled is controlled on the basis of the control signal generated in the image data processing section. Note that controlling of the angle of the reflection surface of the micro mirror 62 will be described later. Further, the controller is provided with a galvano drive control section. The galvano drive control section controls to drive the galvano mirror 104, by being synchronized with a signal from a synchronizing sensor (not shown in the drawings) which detects the laser beam L reflected to a region other than a scan-region by the galvano mirror 104.

Figure 4:
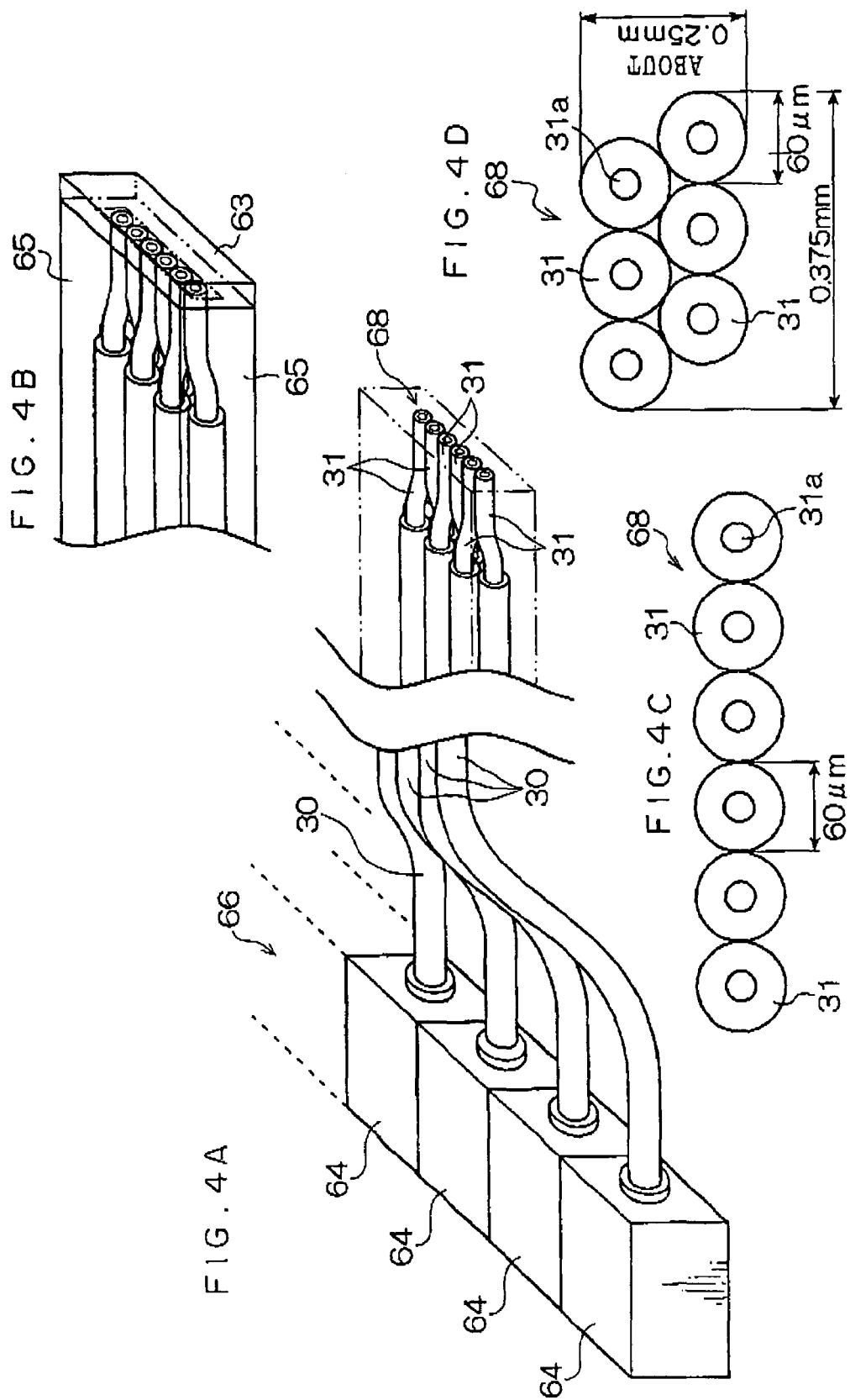
FIG. 4A is a perspective view illustrating the structure of a fiber array light source.
FIG. 4B is a partial enlarged view of FIG. 4A.
FIG. 4C is a plane view illustrating an arrangement of emission points at a laser emitting section.
FIG. 4D is a plane view illustrating another example of an arrangement of the emission points at the laser emitting section.

The fiber array light source 66 is provided with a plurality of laser modules 64 (for example, 6) as shown in FIG. 4A. An one end of multi-mode optical fiber 30 is coupled with each laser module 64. An optical fiber 31 is connected to another end of the multi-mode optical fiber 30. A core diameter of the multi-mode optical fiber 30 is as the same as that of the optical fiber 31, but a clad diameter of the optical fiber 31 is smaller than that of the multi-mode optical fiber 30. The laser emitting section 68 is formed such that emitting ends of the optical fibers 31 (emission points) are arranged in one line in a direction that is perpendicular to the scanning direction as shown in FIG. 4C. As shown in FIG. 4D, the emission points can be arranged in two lines in the direction that is perpendicular to the scanning direction.

End portions of the optical fibers 31 are put (sandwiched) between two support plates 65 whose surface are flat, and fixed as shown in FIG. 4B. In addition, a transparent protection board 63 such as a glass or the like is disposed at the light emitting side of the optical fibers 31 in order to protect end surfaces of the optical fibers 31. The protection board 63 may be disposed so as to closely contact the end surfaces of the optical fibers 31, or the end surfaces of the optical fibers 31 may be sealed in the protection board 63. The emitting end portions of the optical fibers 31 are easily deteriorated and dust is easily collected at the emitting end portions of the optical fibers 31 due to a light density being high. However, due to disposing the protection board 63, it can be prevented that dust adheres to the end surfaces of the optical fibers 31 and deterioration can be slowed.

In the example shown in FIG. 4B, in order to arrange the emitting end portions of the optical fibers 31, whose clad diameter is small, in one line without a gap therebetween the multi-mode optical fibers 30, whose clad diameter is large, are arranged in two lines manner (in the vicinity of the optical fibers 31) as shown in FIGS. 9A and 9B. That is, an optical fiber 31 is arranged between two optical fibers 31 in one line, but a multi-mode optical fiber 30 connected to the optical fiber 31 arranged between the two optical fibers 31 is disposed (piled) onto two multi-mode optical fibers 30 which are respectively connected to the two optical fibers 31. Namely, the multi-mode optical fiber 30 connected to the optical fiber 31 arranged between the two optical fibers 31 and the two multi-mode optical fibers 30 respectively connected to the two optical fibers 31 are not arranged in one line.

Figure 5:
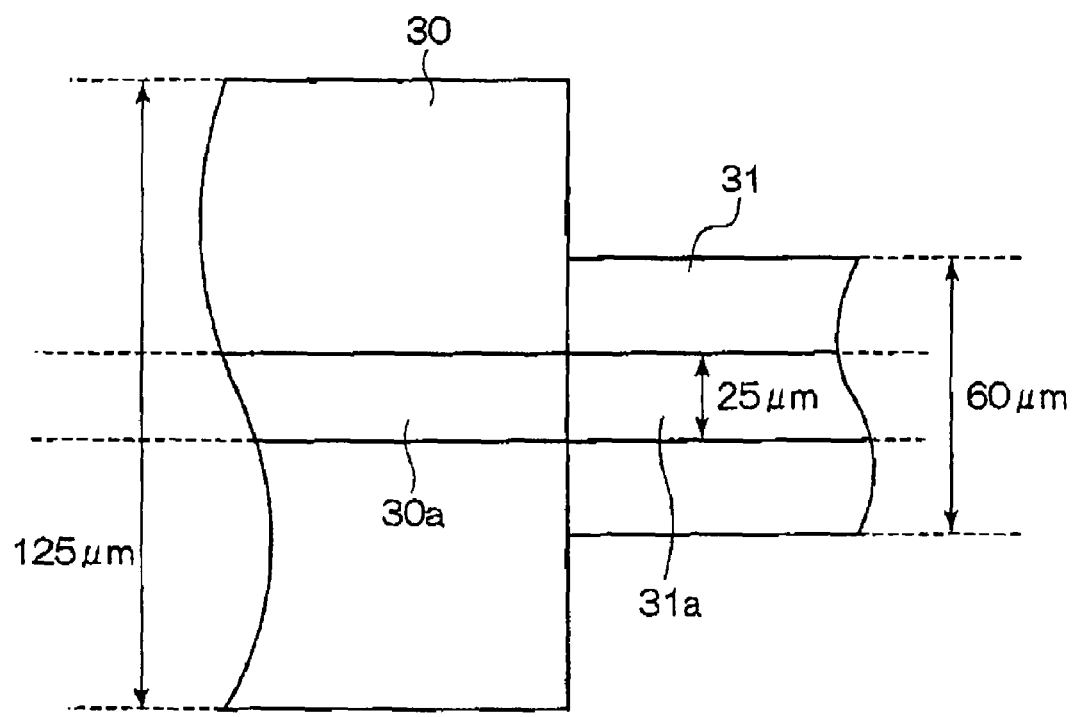
FIG. 5 is a cross sectional view illustrating the structure of a multi-mode optical fiber.

Such optical fiber can be obtained by such a manner in which for example as shown in FIG. 5, the optical fiber 31, whose clad diameter is small and which has length of 1 cm–30 cm, is connected in a coaxial manner to a tip end at the laser light emitting side of the multi-mode optical fiber 30 whose clad diameter is large. The two optical fibers are connected, that is, an incident end surface of the optical fiber 31 is connected by fusion to the emitting end surface of the multi-mode optical fiber 30 such that a central axis of the optical fiber 31 coincides with that of the multi-mode optical fiber 30. As described above, a diameter of the core 31a of the optical fiber 31 is as the same as a diameter of the core 30a of the multi-mode optical fiber 30.

Further, a short length optical fiber may be connected to the emitting end of the multi-mode optical fiber 30 via a ferrule, an optical connector or the like. The short length optical fiber is formed such that an optical fiber whose length is short and a clad diameter is large is connected by fusion to an optical fiber whose clad diameter is small. Due to that the short length optical fiber is connected detachably to be multi-mode optical fiber 30 by using the connector or the like, in a case in which the optical fiber whose clad diameter is small is damaged, it is easy to replace this (damaged) tip portion. As the result, a cost required for maintenance the fiber array source 66 (an optical head) can be reduced. Hereinafter, there may be a case in which the optical fiber 31 is called as an emitting end (portion) of the multi-mode optical fiber 30.

As the multi-mode optical fiber 30 and the optical fiber 31, any one of a step index the optical fiber, a grate index the optical fiber and a complex type optical fiber can be used. For example, the step index type optical fiber made in Mitsubishi Cable Industries Co., Ltd. can be used. In this embodiment the multi-mode optical fiber 30 and the optical fiber 31 are the step index type optical fiber. In the multi-mode optical fiber 30, a clad diameter is 125 µm, a core diameter is 25 µm, NA is 0.2, a transmittance of an incident end surface coat is equal to or more than 99.5%. In the optical fiber 31, a clad diameter is 60 µm, a core diameter is 25 µm, NA is 0.2.

Generally, transmission loss of a laser light in an infrared region increases as a diameter of a clad of an optical fiber becomes smaller. Therefore, preferable diameter of the clad is determined in accordance with wavelength band of the laser light. However, the shorter the wavelength is, the smaller the transmission loss is. Therefore, the transmission loss hardly increases in a case of a laser light whose wavelength is 405 nm and which is emitted from a GaN system semiconductor laser, even if a thickness of the clad {(clad diameter–core diameter) /2} is half of that in a case in which an infrared light in 800 nm wavelength band is transmitted or even if the thickness is one fourth of that in a case in which an infrared light used in an optical communications, in 1.5 µm wavelength band is transmitted.

However, it is not limited in the present invention that the diameter of the clad of the optical fiber 31 is 60 µm. A diameter of a clad of an optical fiber which is used in a conventional fiber light source is 125 µm. The smaller the clad diameter is, the deeper a depth of focus becomes. Therefore, the clad diameter of the multi-mode optical fiber is preferably equal to or less than 80 µm. It is further preferable that the clad diameter of the multi-mode optical fiber is equal to or less than 60 µm. It is moreover preferable that the clad diameter of the multi-mode optical fiber is equal to or less than 40 μm. On the other hand, because it is necessary that a diameter of a clad is at least 3–4 μm, it is preferable that the clad diameter of the multi-mode optical fiber is equal to or more than 10 μm.

Figure 6:
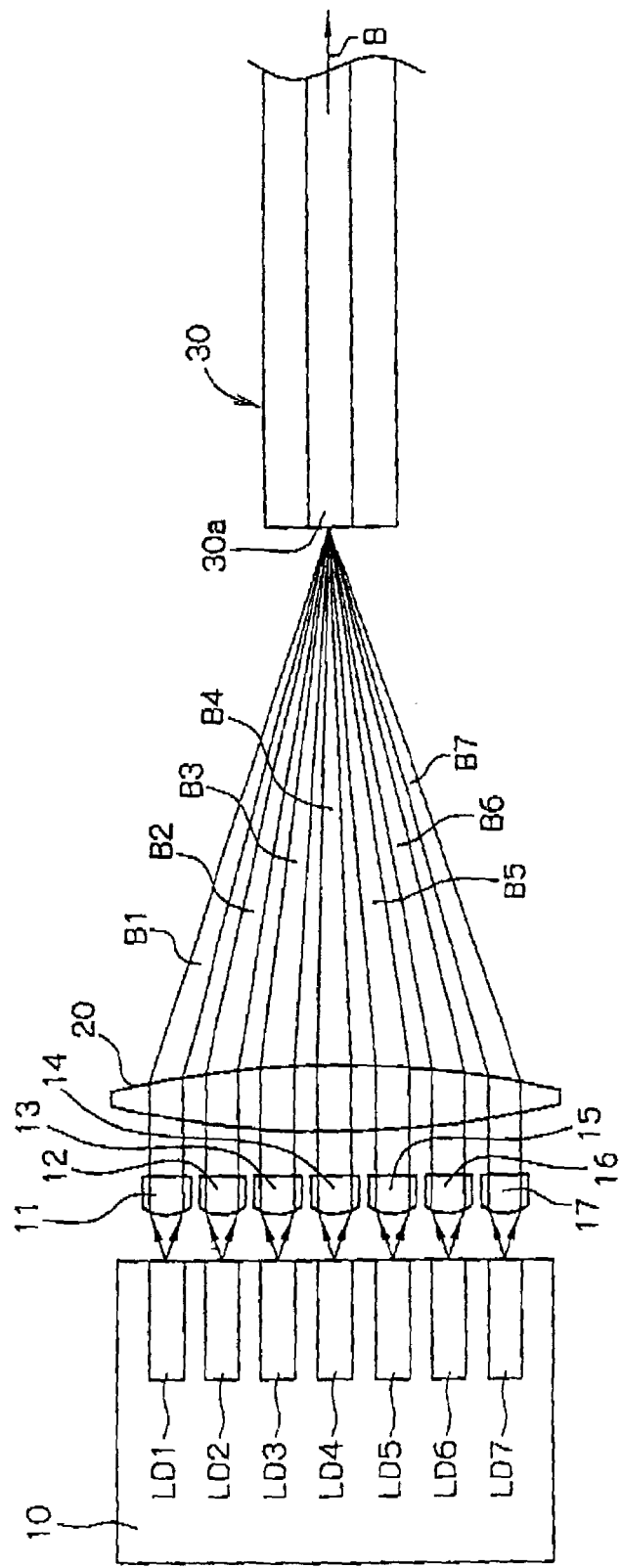
FIG. 6 is a plane view illustrating the structure of a composite-wave laser light source.

The laser module 64 is structured by a composite wave laser light source (a fiber light source) as shown in FIG. 6. The composite wave laser light source comprises a plurality of (for example, 7) GaN (system) semiconductor lasers LD1, LD2, LD3, LD4, LD5, LD6 and LD7, collimator lenses 11, 12, 13, 14, 15, 16 and 17, a single condenser lens 20 and a single multi-mode optical fiber 30. In the embodiment, a number of the semiconductor lasers are seven, however, the present invention is not limited to the same. Generally, as a light source for display, a high output light source is desired. Therefore, because high optical output can be easily obtained in the fiber array light source 66 relating to the preset embodiment, the fiber array light source 66 is suitable for a light source for display.

Oscillation wavelengths of the GaN semiconductor lasers LD1–LD7 are all the same (for example, 405 nm). Also, maximum outputs of the GaN semiconductor laser LD1–LD7 are all the same (for example, 100 mW in the multi mode laser, and 30 mW in the single mode laser). As the GaN semiconductor lasers LD1–LD7, GaN semiconductor lasers, whose oscillation wavelengths are other than above mentioned 405 nm but are in wavelength range between 350 nm and 450 nm, can be used.

Figure 7:
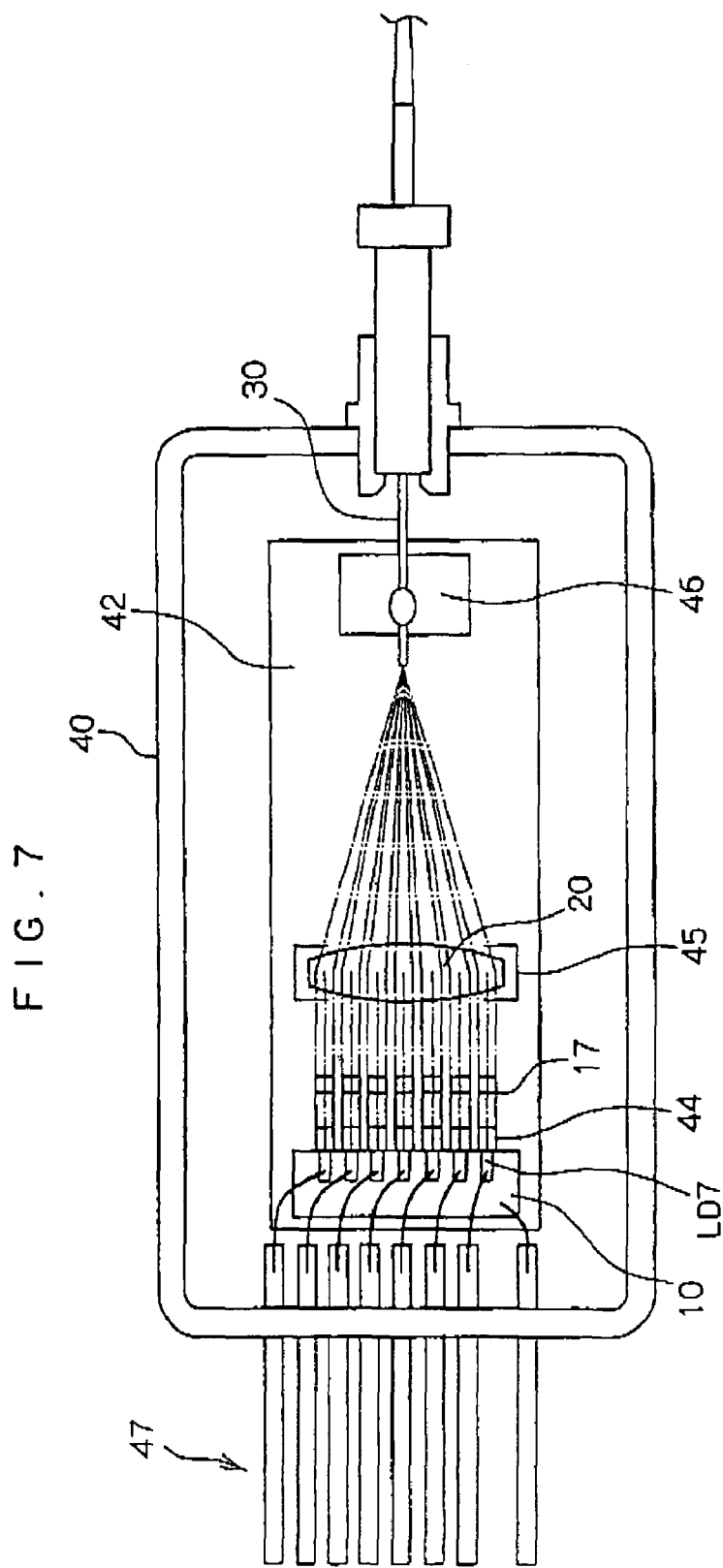
FIG. 7 is a plane view illustrating the structure of a laser module.
Figure 8:
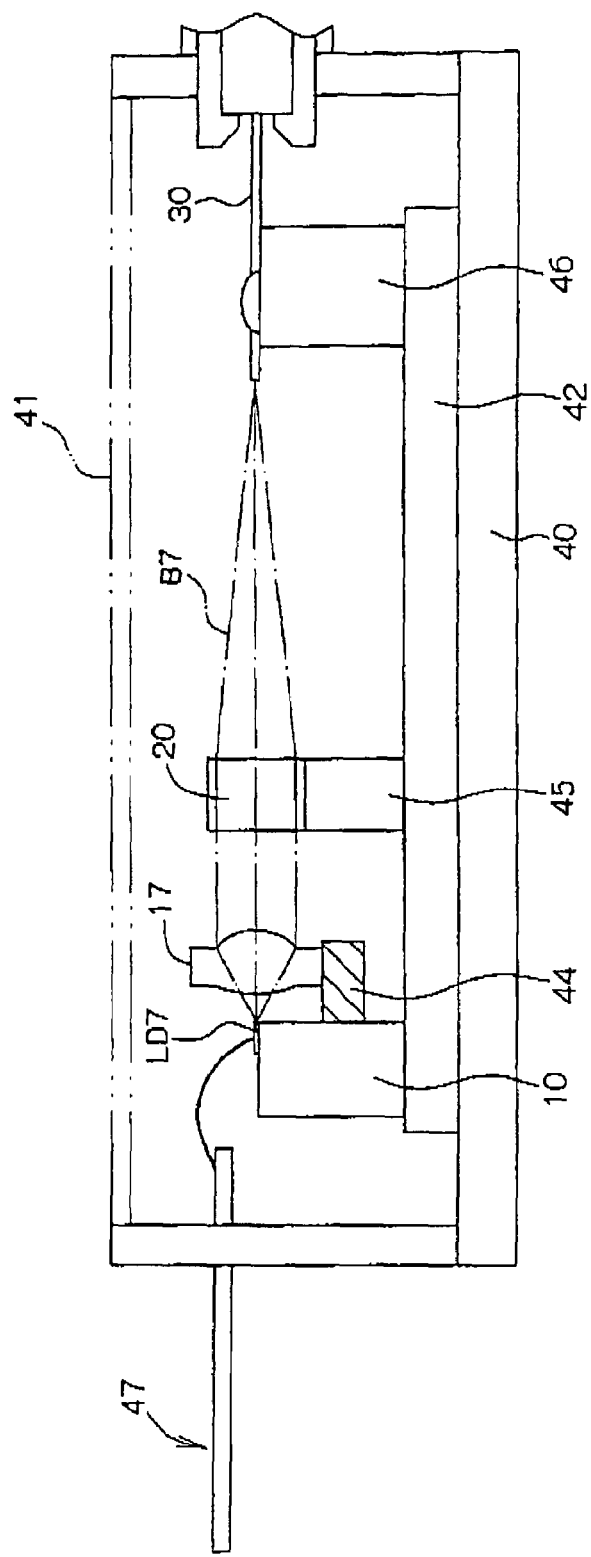
FIG. 8 is a side view illustrating the structure of the laser module shown in FIG. 7.

The composite wave laser light source described above is accommodated in a box shaped package 40 together with other optical elements as shown in FIG. 7 and FIG. 8 An upper side of the package 40 is open. The package 40 is provided with a package cover 41 for closing an opening of the package 40. Gas for sealing is filled into the package 40 in which the opening is closed by the package cover 41 after deairing process is carried out. As the result the above mentioned composite wave laser light source is sealed gastightly within a closed space (a sealed space) formed by the package 40 and the package cover 41.

A base board 42 is fixed to a bottom of the package 40, the heat block 10, a condenser lens holder 45 which holds the condenser lens 20 and a fiber holder 46 which holds the incident end portion of the multi-mode optical fiber 30 are attached on a top surface of the base board 42. The emitting end portion of the multi-mode optical fiber 30 is drawn to an external of the package 40 from an opening formed on a wall surface of the package 40.

In addition, a collimator lens holder 44 is attached at a side surface of the heat block 10, and the collimator lenses 11–17 are held on the collimator lens holder 44 An opining is formed in a side wall surface of the package 40, and interconnections 47 which supply drive electric currents to the GaN semiconductor lasers LD1–LD7 are drawn trough this opening to an external of the package 40.

In order to prevent FIG. 8 from being complicated a number is applied to only the GaN semiconductor laser LD7 among the plurality of the GaN semiconductor lasers, and a number is applied to only the collimator lens 17 among the plurality of collimator lenses.

Figure 9:
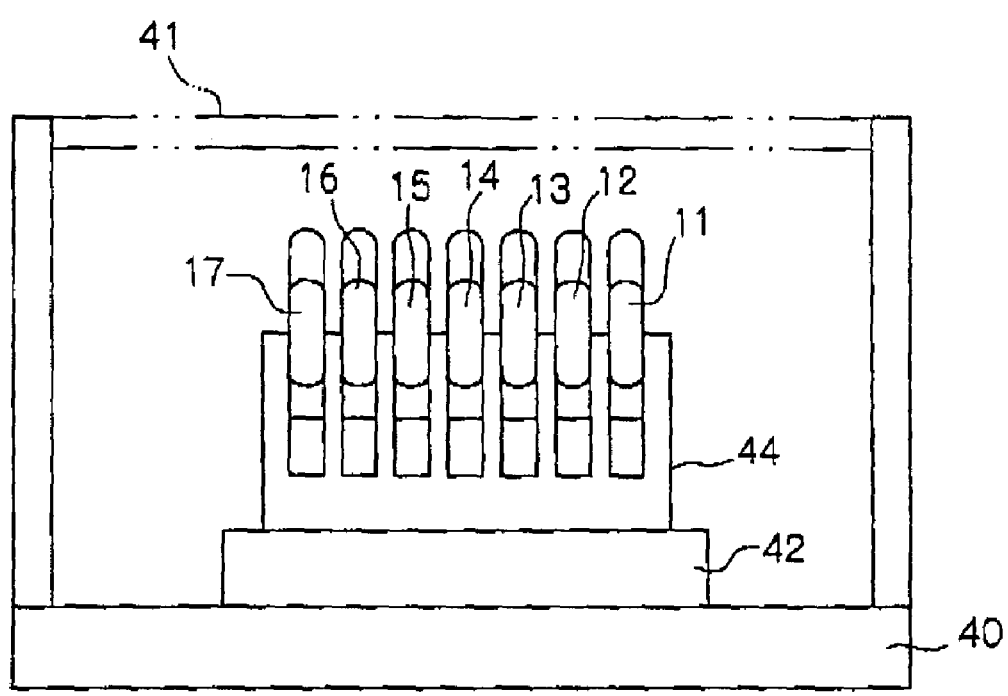
FIG. 9 is a spatial side view illustrating the structure of the laser module shown in FIG. 7.

FIG. 9 shows the above mentioned collimator lenses 11–17 and a portion at which the collimator lens 11–17 are attached seen from front. Each of the collimator lenses 11–17 is formed in a configuration such like that a region including an optical axis of a circular lens provided with an aspheric surface is cut by planes which are parallel. Therefore, each has an elongated configuration. The collimator lens having elongated configuration can be formed, for example, by molding resin or optical glass. The collimator lenses 11–17 are nearly (closely) arranged in an arrangement direction of emission points of the GaN semiconductor lasers LD1–LD7 (a right-left direction in FIG. 9) such that a longitudinal direction of the collimator lens is perpendicular to the arrangement direction of the emission points of the UV semiconductor laser LD1–LD7.

On the other hand, as the GaN semiconductor lasers LD1–LD7, lasers each of which is provided with an active layer whose emission width is 2 μm and which emit laser beams B1–B7, respectively, are used. The laser beams B1–B7 are emitted in a condition in which a spread angle in a direction parallel to the active layer is, for example, 10 degree, and a spread angle in a direction perpendicular to the active layer is, for example, 30 degree. The GaN semiconductor lasers LD1–LD7 are arranged such that emission points are arranged in one line in the direction parallel to the active layer.

Therefore, the laser beams B1–B7 are incident to the respective collimator lenses 11–17 having elongated configuration mentioned above, in a state in which a direction in which the spread angle is large coincides with the longitudinal direction of the collimator lens and a direction in which the spread angle is small coincides with the width direction (a direction perpendicular to the longitudinal direction) of the collimator lens. That is, the width of each of the collimator lenses 11–17 is 1.1 mm, the length of that is 4.6 mm, diameters of the beams incident to the respective collimator lens 11–17 are 0.9 mm in the horizontal direction and 2.6 mm in the vertical direction. In addition, in each of the collimator lenses 11–17, a focus distance f is 3 mm, NA is 0.6, and a lens arrangement pitch is 1.25 mm.

The condenser lens 20 is formed in a configuration such like that a region including an optical axis of a circular lens provided with an aspheric surface is cut by planes which are parallel. Therefore, the condenser lens 20 has an elongated configuration in the horizontal direction, that is, arrangement direction of the collimator lenses 11–17, and has a short dimension in a direction perpendicular to the horizontal direction. For example, in the condenser lens 20, a focus distance f2 is 23 mm, NA is 0.2. This condenser lens 20 can be formed, for example, by molding resin or optical glass.

As shown in FIG. 2 and FIG. 3, the lens system 67 comprises a pair of combination lenses 71, a pair of combination lenses 73 and a condensing lens 75. The combination lenses 71 collimate the laser beam emitted from the fiber array light source 66 such that the laser beam becomes parallel. The combination lenses 73 compensate the collimated laser beam such that a light amount distribution of the laser beam becomes uniform. The condensing lens 75 condense the laser beam in which the light amount distribution is uniformed on the DMD 50. Further, the combination lenses 73 transmit a light so as to spread a flux of the light in the vicinity of an axis of the lenses in an arrangement direction of the laser beam emitting ends, and transmit a light so as to narrow the flux of the light at portions apart from the axis of the lenses in the arrangement direction of the laser beam emitting ends Further, the combination lenses 73 transmit a light as it is in a direction orthogonal to his arrangement direction of the laser beam emitting ends. Therefore, the combination lenses 73 compensate the laser beam L such that the light amount distribution of the laser beam becomes uniform.

Figure 10:
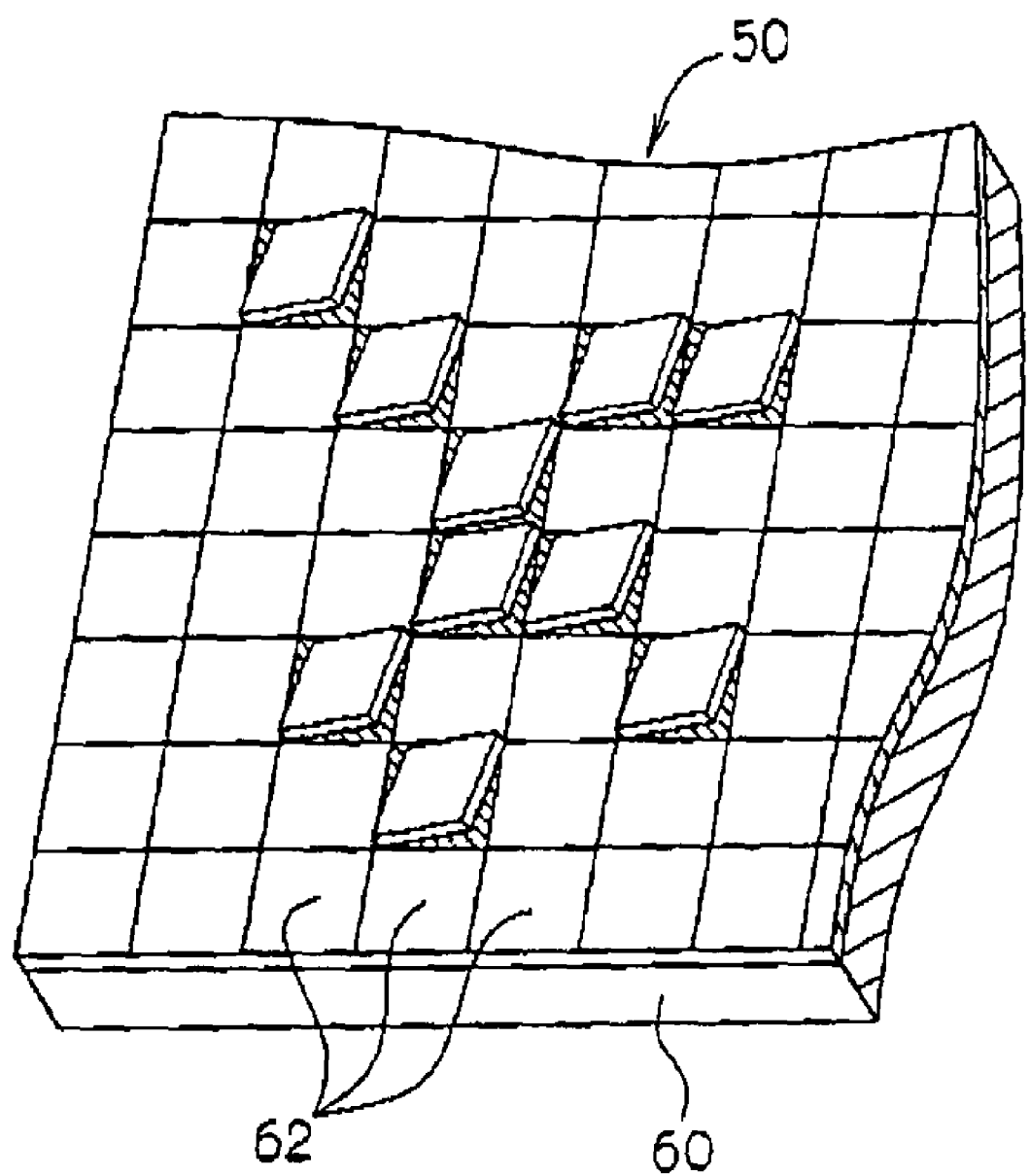
FIG. 10 is a partial enlarged view illustrating the structure of a digital micro-mirror device (DMD).

As shown in FIG. 10, on a SRAM cell (a memory cell) 60, a minute minor (a micro mirror) 62 is arranged such that the minute mirror is supported by leg portions. That is, the DMD 50 is a mirror device in which a lot of (for example, 600×800) minute mirrors forming pixel potions (pixels) are arranged in a grid manner. At an uppermost portion of each pixel, the micro mirror 62 supported by the leg portions is provided, and a material having high reflection factor such as aluminum or the like is vapour-deposited on a surface of the micro mirror 62. The reflection factor of this micro mirror 62 is equal to or more than 90%. In addition, directly below the micro mirror 62, via the leg portions including a hinge and a yoke, the SRAM cell 60 of a CMOS (a complementary metal oxide semiconductor) (a silicon gate) produced at a production line of normal semiconductor memory is disposed. Overall structured is in a monolithic manner (an integral type).

Figure 11A:
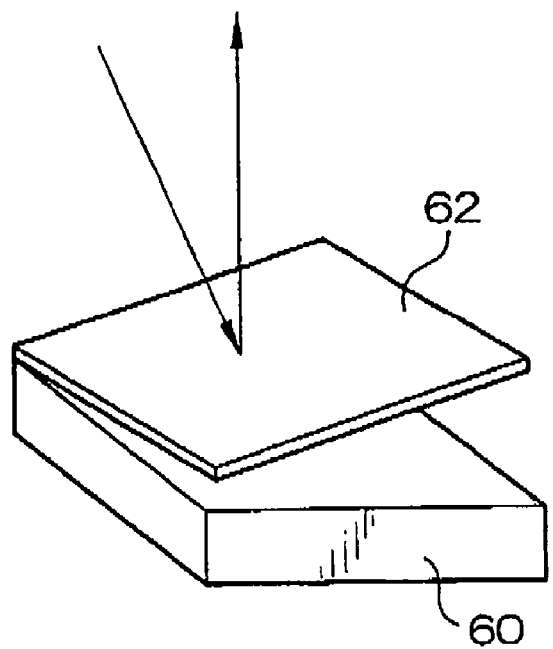
FIG. 11A is an explaining view for explaining an operation of the DMD.
Figure 11B:
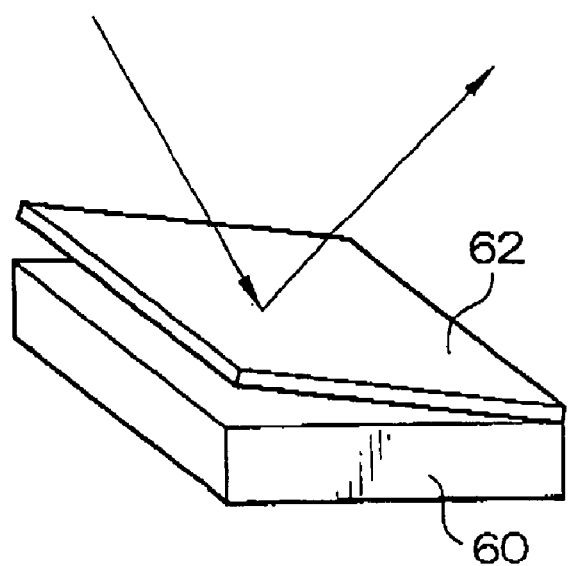
FIG. 11B is an explaining view for explaining an operation of the DMD.

The micro mirror 62 supported by the leg portions is inclined in a range of $\pm\alpha$ degree (for example, $\pm 10$ degrees) with respect a substrate on which the DID 50 is provided (an inclination (a rotation) axis is a diagonal of the micro mirror) when digital signal is written in the SRAM cell 60 of the DMD 50. FIG. 11A shows a state in which the micro mirror 62 is inclined by $+\alpha$ degree, indicating that the micro mirror 62 is ON state. FIG. 11B shows a state in which the micro mirror 62 is inclined by $-\alpha$ degree, indicating that the micro mirror 62 is OFF state. Therefore, in accordance with an image signal, an inclination of the micro mirror 62 in each pixel of the DMD 50 is controlled, for example, as shown in FIG. 10. As the result, the light (the laser beam L) incident to the DMD 50 is each reflected by the micro mirror 62 in accordance with the inclination of the micro mirror 62 (to a direction in accordance with the inclination of the micro mirror 62).

In FIG. 10, an one part of the DMD 50 is magnified, and an example of a state in which the micro mirrors 62 are controlled such that the micro mirrors 62 are inclined by $+\alpha$ degree or $-\alpha$ degree is shown. On-off control of each micro mirror 62 is carried out by a controller, not shown in the drawings, which is connected to the DMD 50. The laser beam L, reflected by the micro mirror 62 which is in ON state, is modulated to a scanning state, and incident to the image forming optical system 146 (refer to FIG. 5) provided at light emitting side of the DMD 50. On the other hand, the laser bean L, reflected by the micro mirror 62 which is in OFF state, is modulated to a non-scanning state, and incident to an optical absorption body (not shown in the drawings).

Figure 12A:
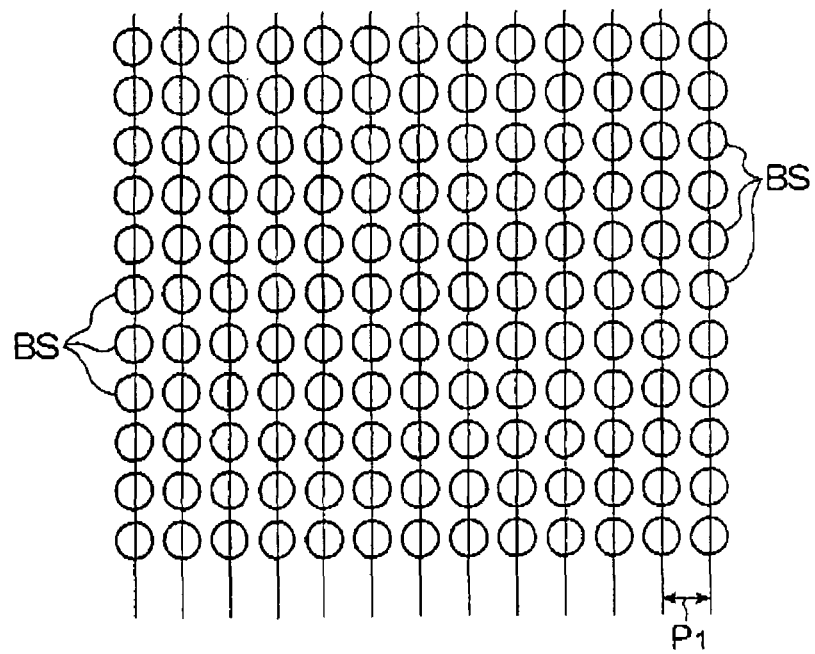
FIG. 12A is a plane view illustrating light beams and scanning lines in a case in which the DMD is not arranged in an inclined manner.

In addition, it is desirable that the DMD 50 is disposed in a slightly inclining manner such that a short side of the DMD 50 is slightly inclined with respect to the sub scanning direction (a horizontal direction) in the screen 102 by a predetermined angle $\theta$ (for example, 0.1°–0.5°). FIG. 12A shows beam spots BS by respective (corresponding) micro mirrors 62 and scanning loci of the respective beam spot BS in a case in which the DMD 50 is not inclined FIG. 12B shows beam spots BS and scanning loci of the respective beam spots BS in a case in which the DMD 50 is inclined by an angle $\theta_I$.

In the DMD 50, many sets (for example, 600 sets) of micro mirror columns are arranged along a short direction (column direction, that is, a direction indicated by an arrow DR) corresponding to the sub scanning direction in the screen 102 in the DMD 50. In each micro mirror column, a lot of (for example, 800) the micro mirrors are arranged along a longitudinal direction (row direction, that is, a direction indicated by an arrow DL) corresponding to the main scanning direction in the screen 102. As shown in FIGS. 8A and 8B, a pitch P2 of the scanning loci (the scanning lines) of the laser beams L by respective micro mirrors (a distance between the adjacent scanning lines) in a case in which the DMD 50 is inclined is narrower an a pitch P1 of the scanning loci (the scanning lines) in a case in which the DMD 50 is not inclined. Therefore, a resolution can be much improved in the case in which the DMD 50 is inclined. On the other hands a scanning width in the case in which the DMD 50 is not inclined is substantially the same as a scanning width in the case in which the DMD 50 is inclined, because an inclined angle of the DMD 50 is minute.

Figure 12B:
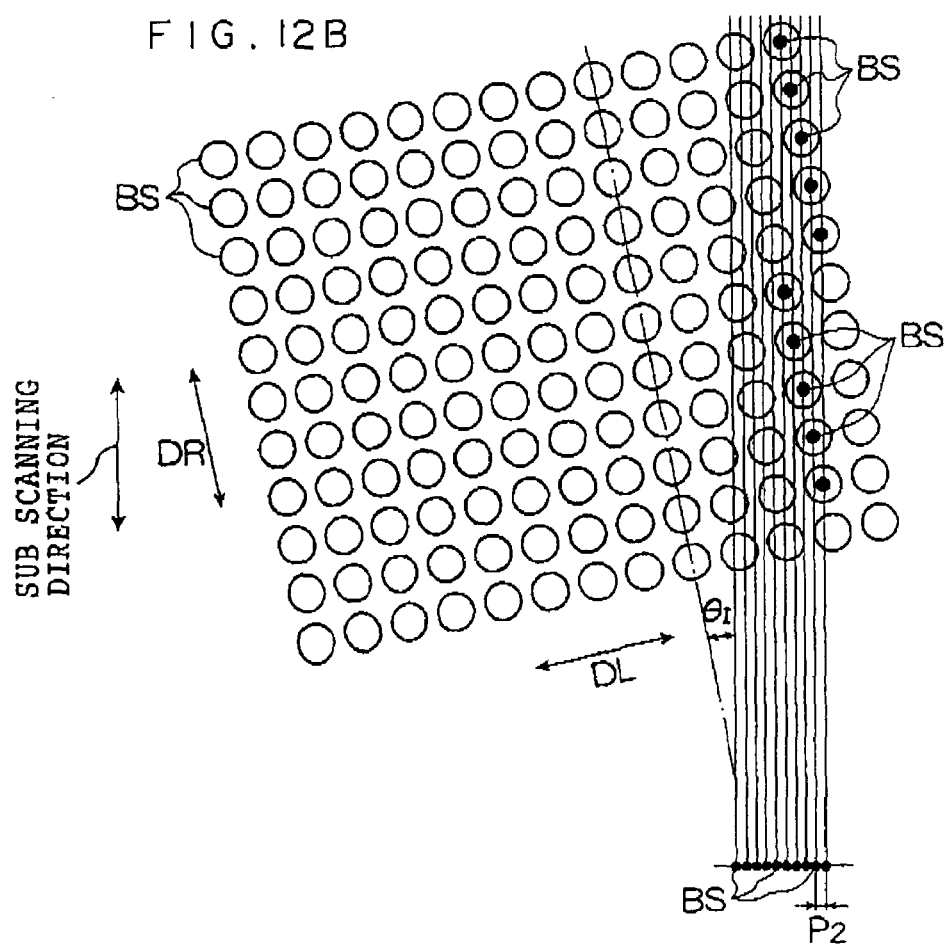
FIG. 12B is a plane view illustrating light beams and scanning lines in a case in which the DMD is arranged in an inclined manner for comparing to the case in which the DMD is not arranged in the inclined manner shown in FIG. 12A

Further, as shown in FIG. 12B, substantially same positions (dots) on the same main scanning line are scanned in a multiple manner (multiplex-scanned) by a plurality of micro mirrors 62 on the different columns. As the result due to the multiplex scanning even if one of the micro mirror 62 (some of micro mirrors 62) in the DMD 50 has a defect such as an operation-NG and the like, the screen 102 can be scanned by the laser beam L modulated by the micro mirror(s) 62 located in the same position in the main scanning direction of this micro mirror 62 which has the defect Accordingly, an image defect on a display image caused by defect of a micro mirror 62 can not be conspicuous (stand out). In other words, occurrence of an image defect can be prevented.

Next a concrete example of setting method of the inclined angle $\theta_I$ of the DMD 50 will be explained.

Figure 14:
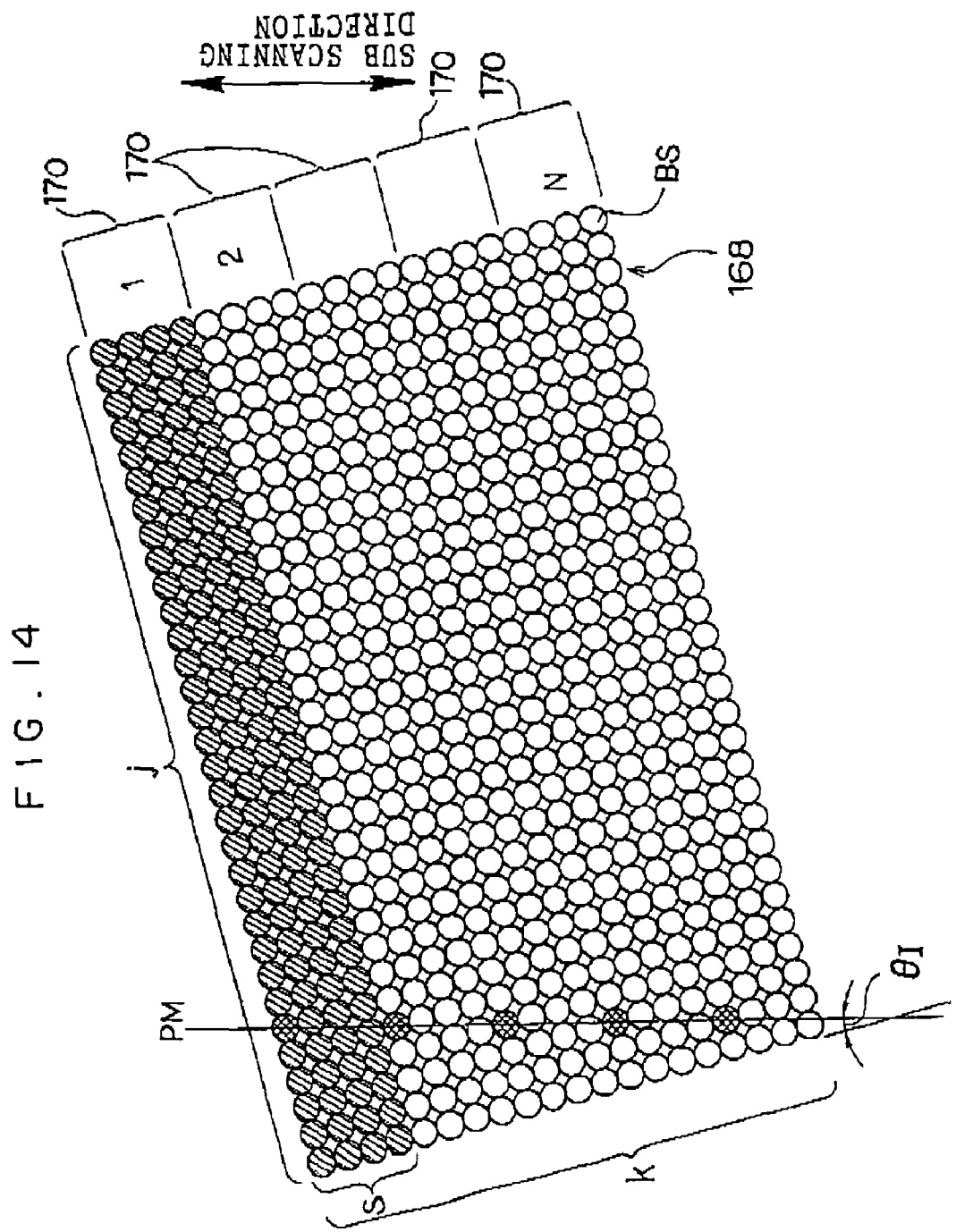
FIG. 14 illustrates an illumination area on a galvano mirror obtained by light beam modulated by the DMD.

In FIG. 14, an illumination area 168, which is a two dimensional image, obtained (formed) on the light reflection surface 105 of the galvano mirror 104 by a piece of the DMD 50, is schematically shown. The illumination area 168 is arranged such that, as a whole, a number of bean spots along the row direction is j, a number of beam spots along the column direction is k. The illumination area 168 is divided into small regions 170. Each small region 170 has N beam spots including S beam spots in the row direction corresponding to the sub scanning direction, (an example, in which S=4, j=32, and N=5, is shown in FIG. 14,)

Here, N agrees with a number of the beam spots BM (a number of multiplex-scanning lines) which scan the same position PM in the main scanning direction. At this time, the inclined angle $\theta_I$ of the DMD 50 is calculated by the follow formula (1).

$$\theta_I = \pm\tan^{-1}(1/S) \quad (1)$$

Figure 13:
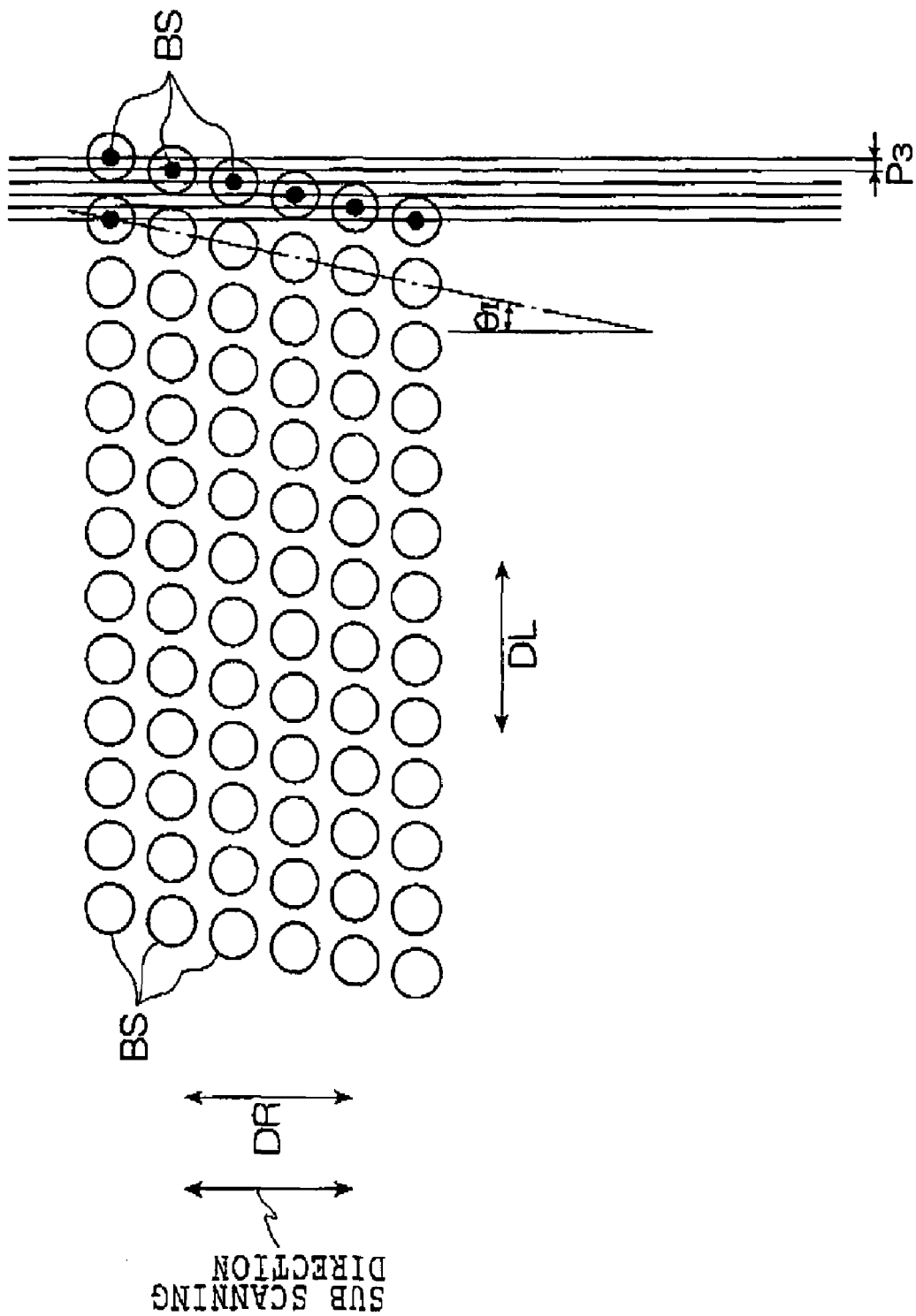
FIG. 13 is a plane view illustrating disposition of the light beams in a case in which micro mirrors of the DMD is arranged in a zigzag manner.

Instead of inclining the DMD 50 (serving as the spatial modulation element) itself, as shown in FIG. 13, a plurality of micro mirrors 62 arranged in the row direction (a direction indicated by an arrow DL) in the DMD 50 can be shifted by a predetermined pitch $P_3$, in the row direction. That is, each micro mirror column can be shifted wit respect to the adjacent micro mirror column by the predetermined pitch $P_3$. Namely, the micro mirrors 62 can be arranged in a zigzag manner. In this case, the basically common operation obtained in the case in which the DMD 50 is inclined can be obtained.

Next the image forming optical system 146 disposed at the light reflection side of the DMD 50 will be explained. As shown in FIGS. 2 and 3, in the laser display device 100, the image forming optical system 146, for which images (image-forms) an real image (a reflection light image by the micro mirrors 62) on the light reflection surface 105 of the galvano mirror 104, is provided at the light reflection side of the DMD 50. In the image forming optical system 146, a pair of lens systems 54 and 58, a micro lens array 72 and a pair of lens systems 80 and 82 are disposed in that order from the DMD 50 toward the galvano mirror 104.

Here, the lens systems 54 and 58 are structured as, for example, a magnification optical system having a predetermined magnification. A cross section area of a group of a plurality of laser beams L (hereinafter, a beam group, if necessary), reflected by each of the micro mirrors 62 of the DMD 50, is enlarged by the lens system 54 and 58. As the result an illuminate-area by the beam group incident to the light reflection surface 105 of the galvano mirror 104 is enlarged by a predetermined amount.

In the micro lens array 72, a plurality of micro lenses 74, corresponding to respective micro mirrors 62 of the DMD 50 one to one, are integrally formed. These micro lenses 74 are disposed on optical axes of the laser beam groups transmitted trough the lens systems 54 and 58, respectively. Further, these micro lenses 74 are disposed at surfaces (conjugate surfaces) on which real images of the respective micro mirrors 62 are formed by the lens systems 54 and 58. In the micro lens array 72, a plurality of the micro lenses 74 are arranged in a two dimensional manner by pitch which is as the same as that of the real images of the micro mirror 62 formed on the conjugate surfaces. Each of the micro lenses 72 is formed as a condenser lens which has a positive lens power.

The laser beam L transmitted through each micro lens 74 of the micro lens array 72 is incident to the lens systems 80 and 82. The laser beam L emitted from the lens systems 80 and 82 is imaged (image-formed) on the light reflection surface 105 of the galvano mirror 104 to form the beam spot BS. In the present embodiment, the beam spot BS is imaged as a real image a reflection light image of the micro mirror 62. However, the image forming optical system 146 may be designed such that a light source image (a far field pattern) is imaged on the light reflection surface 105 of the galvano mirror 104 as the beam spot BS.

By referring to FIGS. 12B and 12C, an operation of the micro lens in the image forming optical system 146 will be explained. The cross section area of the beam group, which is the group of the laser beams L, reflected by the DMD 50, is enlarged by the image forming optical system 146 including the lens systems 54 and 58. As the result, the illuminate-area of the beam group on the light reflection surface 105 is enlarged by the predetermined amount. At this time, the laser beam L reflected by each micro mirror 62 of the DMD 50 is transmitted through the lens systems 54 and 58. As the result, a diameter of the laser beam is enlarged in accordance with an optical magnification of the image forming optical system 146. Therefore, in a case in which the micro lenses 74 are not disposed in the image forming optical system 146, the spot diameter of each beam spot BS irradiated to the light reflection surface 105 becomes large in accordance with the optical magnification of the image forming optical system 146. Accordingly, when the beam spot BS is projected and scanned by the galvano mirror 104, MTF characteristic (Modulation Transfer Function) on the screen 102 becomes low in accordance with the optical magnification of the image forming optical system 146.

In order to prevent that the MTF characteristic becomes low, as mentioned above, in the image forming optical system 146, a plurality of micro lenses 74, corresponding to respective micro mirrors 62 of the DMD 50 one to one, are disposed in a two dimensional manner such that the micro lenses 74 are disposed in positions (the image positions) at which real images of the micro mirrors 62 are formed. That is, each micro lens 74 corresponds in one-to-one manner to each micro mirror 62. As the result the beam spots imaged on the light reflection surface 105 of the galvano mirror 104 becomes small as shown in black points in FIGS. 12b and 12C. Therefore, it is prevented that the beam spots are overlapped each other on the light reflection surface 105. As the result the MTF characteristic on the screen 102 can be improved effectively without being affected by the optical magnification of the image forming optical system 146, and quality of an image of large size displayed on the screen 102 can be improved much.

It has been explained that the image forming optical system 146 is a magnification optical system comprising the lens systems 45, 48, 80, 82 and the micro array 72 in the present embodiment. However, a number of optical members such as the lens systems and the like constructing such image forming optical system 146 can be increased or decreased in accordance with a length of an optical path an optical magnification, an aberration or the like Further, it is possible that the image forming optical system 146 is an optical system in which magnification is variable such as a zoom lens or the like.

The galvano mirror 104 has a rotation axis 108 parallel to the main scanning direction. That is, the galvano mirror 104 is supported such that the galvano mirror 104 can rotate around the rotation a 108 (center of rotation). The galvano mirror 104 is provided with a magnetic drive section (not shown in the drawings). The magnetic drive section generates torque whose amount and direction corresponding to polarity and intensity of a drive signal from the galvano drive section in the controller. Thus, the magnetic drive section rotates the light reflection surface 105 by an angular speed in accordance with the gated torque by the magnetic drive section. As the result, the laser beams L (the beam group) modulated by the DMD 50 are reflected toward the screen 102, and deflected so as to scan on the screen 102 along the sub scanning direction (the horizontal direction) in a predetermined sub scanning speed. Thus, an image is projected and displayed on the screen 102. At is time, in order to prevent that the displayed image has distortion at a periphery region thereof, the Fresnel lens 106 deflects the laser beams L. That is, the condenses the laser beam L reflected by the galvano mirror 104 in such a manner in which the laser beam L has a different intensity in accordance with an incident position on the screen 102, and the beam group incident to the screen 102 becomes parallel light.

On the other hand, a luminophor (a fluorophor) which emits a white light when a laser beam of 405 nm is irradiated thereon is provided on an image display surface 103 of the screen 102. The luminophor is dispersed uniformly on the image display surface 103 or coated on the image display surface 103 so as to form a emission layer, For example, a yttrium/aluminum/garnet luminophor or the like which is activated by a rare earth element is used as the luminophor. Accordingly, in the display device 100, when the image display surface 103 is scanned by the laser beam L emitted from the GaN semiconductor laser to display an image on the display surface 103, the image is displayed on the image display surface 103 by the white light emitted from the luminophor in addition to the reflection light of the laser beam L. Therefore, an image contrast becomes high. As the result, an image which has good quality to be seen can be displayed (Operation of Laser Display Device)

Next an operation of the laser display device, relating to the embodiment of the present invention, constructed in the manner mentioned above will be explained.

In the display device 100, the laser beams B1, B2 B3, B4, B5, B6 and B7 are emitted, each in a state of divergent ray, from the respective GaN semiconductor lasers LD1–LD7 forming (included in) the composite wave laser light source of the fiber array light source 66. These laser beams B1, B2, B3, B4, B5, B6 and B7 are changed to parallel fights by means of the corresponding collimator lenses 11–17 as shown in FIG. 6. The laser beams B1, B2, B3, B4, B5, B6 and B7 which are collimated are collected (condense) by means of the condenser lens 20, and converges in the incident end surface of the core 30a of the multi-mode optical fiber 30.

In this embodiment a collection optic system is constructed by the collimator lenses 11–17 and the condenser lens 20, and a composite-wave optic system is constructed by the collection optic system and the multi-mode optical fiber 30. That is, the laser beams B1–B7 condensed by the condense lens 20 as mentioned above are incident into the core 30a of the multi-mode optical fiber 30, then transmits in the optical fiber. The laser beams are wave-compounded and the composite single laser beam B is emitted from the optical fiber 31 connected to the emitting end surface of the multi-mode optical fiber 30.

In a case in which a combination (bonding) efficiency of the laser beams B1–B7 to the multi-mode optical fiber 30 is 0.85 and each output of the GaN semiconductor lasers LD1–LD7 is 30 mW in each laser module, the composite laser beam B of an output 180 mW(=30 mW×0.85×7) is obtained in each of the optical fibers 31 that are arranged in array manner. Therefore, an output at the laser outputting portion 68 in which six optical fibers 31 are arranged in array manner is about 1 W(=180 mW×6).

For example, in a case of a conventional fiber light source in which semiconductor lasers and optical fibers are connected in an one to one manner, a laser whose output is about 30 mW(milli watt) is generally used as the semiconductor laser. A multi-mode optical fiber whose clad diameter is 125 μm, core diameter is 25 μm, NA (open number) is 0.2 is used as the optical fiber. Accordingly, in order to obtain an output of about 1 W(watt), it is necessary that 48(8×6) multi-mode optical fibers are bundled. Here, an area of an emission region is 0.62 mm$^2$(0.675 mm×0.925 mm). Therefore, luminance (brightness) at the laser emitting section is $1.6×10^6$ (W/m$^2$), and luminance of a single optical fiber is $3.2×10^6$ (W/m$^2$).

In contrast, in the present invention, as mentioned above, an output of about 1W(watt) can be obtained by 6 multi-mode optical fibers. Here, an area of an emission region in the laser emitting section 68 is 0.0081 mm$^2$(0.325 mm×0.025 mm). Therefore, luminance at the laser emitting section 68 is $123×10^6$(W/m$^2$). That is, the luminance of the present embodiment is eighty times as large as that in the conventional device, and high luminance can be archived. Further, luminance of a single optical fiber is $90×10^6$(W/m$^2$). That is, the luminance of a singe optical fiber of the present embodiment is twenty-eight times as large as that in the conventional device, and high luminance can be archived. As the result, an angle of the luminous flux incident to the DMD 50 becomes small, therefore, an angle of the luminous flux incident to the image display surface 103 ( a surface to be scanned) becomes small. Therefore, depth of focus of the beam spot can be deeper.

Image data in accordance with a display pattern is inputted into the controller, not shown in the drawings, connected to the DMD 50, and is stored once in a frame memory in the controller. This image data is data in which a density of each pixel which forms an image is represented with binary (presence of a record of a dot or not).

The controller drives, when receiving the image display signal, the fiber array light source 66. Also, the controller reads out the image data stored in the frame memory such that each data corresponding to a plurality of lines of the image is sequential read. Then, this image data (line image data) is outputted to the data processing section. On the basis of the line image data, at the data processing section, a control signal is generated. Then, on the basis of the generated control signal, each of micro mirrors of the DMD 50 is on-off controlled by the mirror driving control section. At this time, the controller outputs the image data from the frame memory to the data processing section every predetermined modulation cycle. A modulation state for the laser beam L of the DMD 50 is varied every this modulation period.

When the laser light is irradiated from the fiber array light source 66 to the DMD 50, the laser beam L (the beam) reflected at the time of ON state of the micro mirror of the DMD 50 is imaged (image-formed)on a light reflection 105 of the galvano mirror 104 by the imaging optical system 146. At this time, the galvano drive control section rotates the galvano mirror 104 with an angular velocity corresponding to the modulation cycle of the DMD 50. The beam modulated by the DMD 50 every predetermined modulation cycle is moved (sub scanned) along the sub scanning direction on the image display surface 103 of the screen 102. The two dimensional image corresponding to image data is projected (displayed) on the image display surface 103.

Figure 15A:
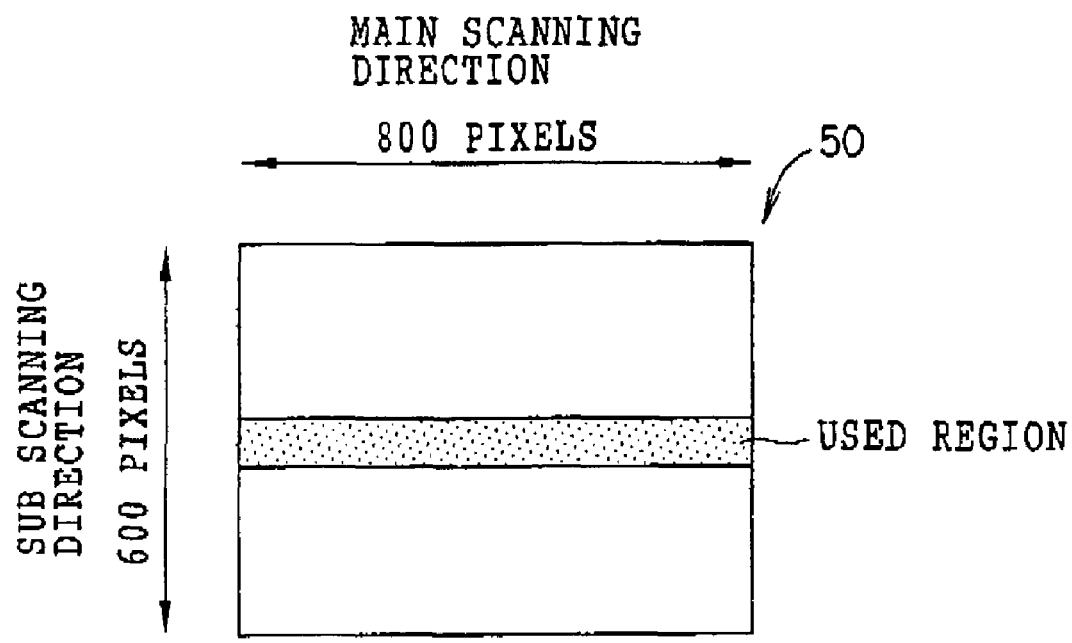
FIG. 15A illustrates an example of a used region of the DMD.
Figure 15B:
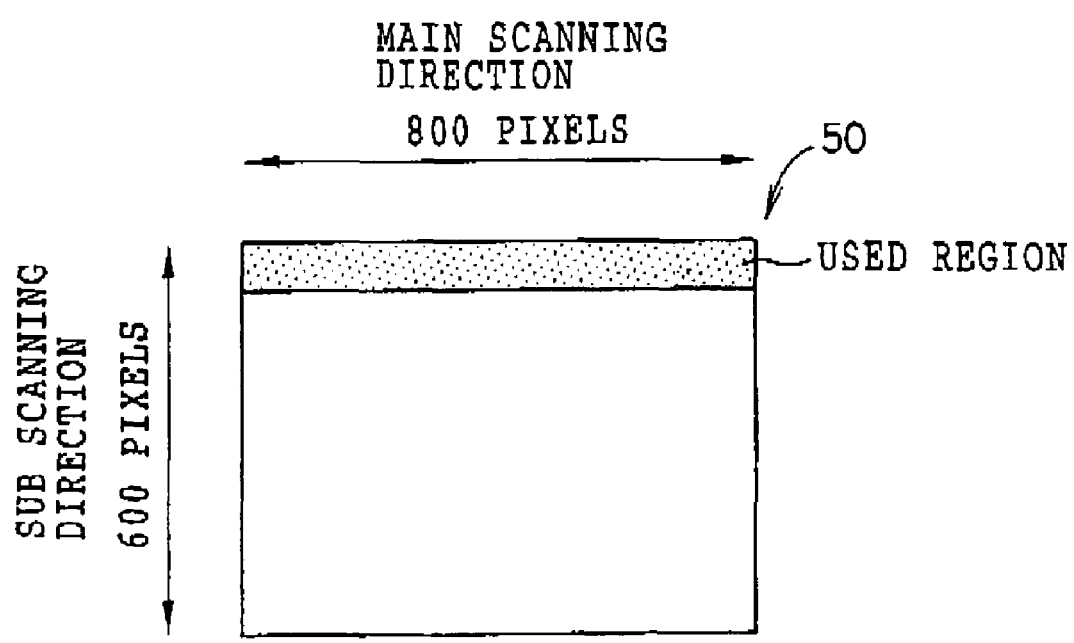
FIG. 15B illustrates another example of a used region of the DMD.

As shown in FIGS. 15A and 15B, in the present embodiment, in the DMD 50, the micro mirror columns of 600 sets, each of which 800 micro mirrors are arranged in the main scanning direction, are arranged in the sub scanning direction. However, in the present embodiment, the controller controls the DMD 50 such that only a portion of the micro mirror columns (for example, 100 sets of the micro mirror columns, that is, 800×100 micro mirrors) are driven.

As shown in FIG. 15A, micro mirror columns located in a central portion of the DMD 50 may be used, or micro mirror columns located in an end portion of the DMD 50 may be used as shown in FIG. 16B. In addition, in a case in which one (or some) micro mirror is damaged (has a defect), micro mirror columns which do not include a defect micro mirror are used, that is, micro mirror columns which are used can be changed appropriately depending on the situation.

A speed of processing data of the DMD 50 has a limited maximum speed. A modulation rate (speed) of an one line is determined in proportion to the number of pixels to be used. The modulation rate of the one line becomes faster by using only a part of the micro mirror columns compared with a case in which all micro mirror columns are used. Note that it is not necessary that all micro mirror columns in the sub scanning direction are used in a case of a display method in which an optical head is relatively moved continuously with respect a surface to be scanned.

For example, in a case in which only 300 sets of the micro mirror columns among 600 sets of the micro mirror columns are used, the modulation rate per one line is two times as fast as that in a case in which all 600 sets of the micro mirror columns are used. Further, in a case in which only 200 sets of the micro mirror columns among 600 sets of the micro mirror columns are used, the modulation rate per one line is three times as fast as that in the case in which all 600 sets of the micro mirror columns are used. Moreover, in a case in which only 100 sets of the micro mirror columns among 600 sets of the micro mirror columns are used, the modulation rate per one line is six times as fast as that in the case in which all 600 set of the micro mirror columns are used.

More than or equal to 10 and less than or equal to 200 are desirable for the number of micro mirror columns to be used, that is, the number of micro mirrors arranged in the sub scanning direction. More than or equal to 10 and less than or equal to 100 are more desirable. An area of one micro mirror, corresponding to one pixel, is 15 μm×15 μm. Therefore, when converting the above into a micro mirror used region of the DMD 50, a region of more than or equal to 12 mm×150 μm and less than or equal to 12 mm×3 mm are preferable, and a region of more than or equal to 12 mm×150 μm and less than or equal to 12 mm×1.5 mm are more preferable.

If the numbers of micro mirror columns to be employed are within the above mentioned range, the laser beam emitted from the fiber array light source 66 is made substantially parallel by the illumination lens system 67, and can be irradiated onto the DMD 50, as shown in FIG. 2 and FIG. 3. It is preferable that an irradiation region to which the laser light is irradiated by the DMD 50 agrees with the used region in the DMD 50. Because if the irradiation region is wider an the used region, usage-efficiency of the laser light becomes lower.

As mentioned above, in the laser display device 100 relating to the present embodiment mentioned above, at least the column direction of the arrangement directions of the micro mirrors 62 in the DMD 50 is inclined with respect to the sub scanning direction by the predetermined inclining-angle $\theta_I$, and the inclining-angle $\theta_I$ is set in accordance with the scanning density of the beam (bundle of beams) in the main scanning direction on the image display surface 103. Accordingly, in a case in which j micro mirrors 62 are arranged along the row direction corresponding to the main scanning direction and k micro mirrors 62 are arranged along the column direction corresponding to the sub scanning direction on the DMD 50, positions, which are different each other, on the same scanning line on the image display surface 103 can be scanned with N multiple of j (j×N) laser beams L (N is a positive integer, $N \leq k$) in accordance with the predetermined scanning-angle $\theta_I$ of the column direction of the micro mirrors 62 with respect to the sub scanning direction. Therefore, by adjusting properly an amount of the inclining-angle $\theta_I$ of the column direction of the micro mirrors 62, a pixel density of an image displayed on the image display surface 103 can be increased to a desired density value.

In the present embodiment mentioned above, the DMD is used as the spatial light modulation element. However, controlling method, in which a transmitting rate is made high by using only a part of the pixel portions (the micro mirrors) of the spatial light modulation element (the digital micro device), can be applied to other spatial light modulation elements such as an optical shutter array, an interference shutter array or the like whose structure is different from the DMD. Therefore, in a case in which the spatial light modulation element other than the DMD is used in accordance with the specification of the device a transmitting the can be made light by using only a part of the pixel portions.

As the result, (in a display device using an one-dimensional spatial light modulation element such as a GLV or the like, it is necessary to increase an installation number of the one-dimensional spatial light modulation elements in accordance with increasing of number of pixels of a displayed image in a display device, however) in the display device of the present invention, it is not necessary to increase an installation number of the light modulation elements. Therefore, in the present embodiment, an image having the desired pixel density can be displayed by only setting the inclining-angle $\theta_I$ of the column direction of the micro mirrors 62 in accordance with the desired scanning density, without increasing of number of the DMD 50 and increasing of number of pixels.

Further, in the display device 100, the inclining-angle $\theta_I$ the column direction is set such a plurality (N) of micro mirrors 62 are positioned at the same position along the main scanning direction. Therefore, the same position (the same pixel) on the same scanning line along the main scanning direction on the surface to be scanned on the image display body is scanned N times (that is, multi scanning is carried out) by laser beams modulated by N micro mirrors 62 each of which is arranged in different columns in the DMD 50. Therefore, even if one (some) of the micro mirrors 62 has defect, an image quality degradation of the display image caused by defect of this micro mirror 62 is not conspicuous.

(A Second Embodiment)

Figure 16:
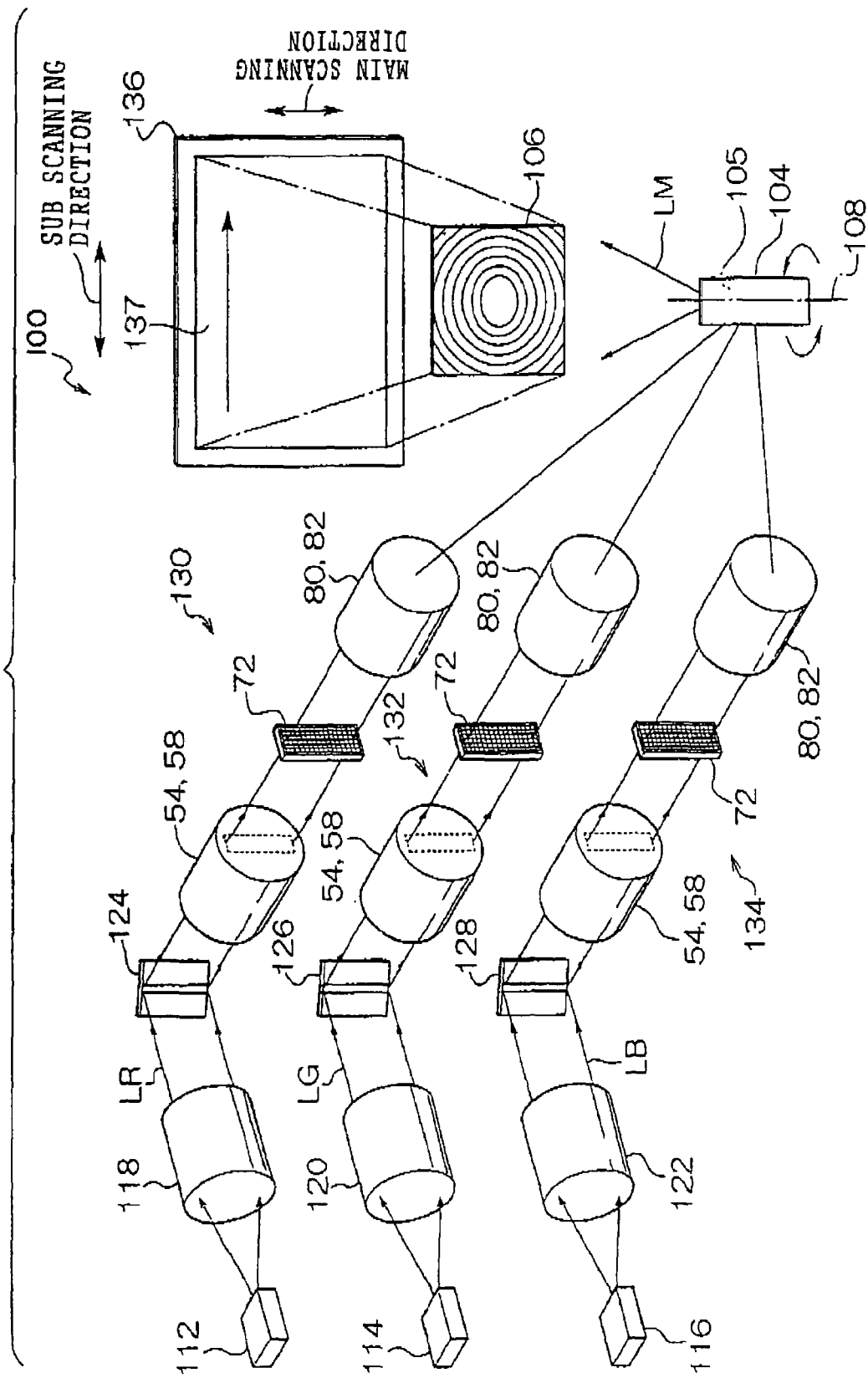
FIG. 16 is a perspective view illustrating the structure of a laser display device related to a second embodiment of the present invention.

A laser display device 110 related to the second embodiment of the present invention will be explained. In FIG. 16, the laser display device 110 related to the second embodiment of the present invention is shown. In the laser display device 110, an image display surface 137 of a screen 136 is directly scanned by a color laser beam LM in which a red laser beam LR, a green laser beam LG and a Blue laser beam LB are mixed. That is, the laser display device 110 is a projector-type device in which a color image is projected and displayed on the image display surface 137. Note that, in the laser display device 110 related to the second embodiment, the same reference numerals are applied to the same components, members and structures as those of the laser display device 100 related to the first embodiment and the descriptions thereof are omitted.

As shown in FIG. 16, the laser display device 110 is provided with three GaN semiconductor laser (hereinafter, LD) 112, 114 and 116, each of which is a taper amplifier type, and which emit ultraviolet lights (output=3 W) in accordance with respective colors (that is, a read color, a green color and a blue color), as light source devices. On an optical path of the laser beam LR emitted from the LD 112, an illumination optical system 118, a DMD 124, and an imaging (image forming) optical system 130, are disposed. Further, On an optical path of the laser beam LG emitted from the LD 114, an illumination optical system 120, a DMD 126, and an image forming optical system 132, are disposed. Moreover, On an optical path of the laser beam LB emitted from the LD 116, an illumination optical system 122, a DMD 128, and an image forming optical system 134, are disposed. Here, the illumination optical system 118, 120 and 122, the DMD 124, 126 and 128, and the image forming optical system 130, 132 and 134 have the common structures of those of the illumination optical system 67, the DMD 50, and the image forming optical system 146 in the first embodiment, respectively, except for that each of the illumination optical system 118, 120 and 122, the DMD 124, 126 and 128, and the image forming optical system 130, 132 and 134 is provided for the laser beam LR, LG, or LB.

In the laser display device 110, the laser beams LR, LG and LB emitted from the respective LD 112, LD114 and LD 116 are incident to the respective DMD 124, 126 and 128 through the respective illumination optical system 118, 120 and 122. Modulation is carried out by each DMD 124, 126 and 128 in accordance with image data of read, green, blue. These modulated 3 color laser beans LR, LG, LB are imaged on the light reflection surface 105 of the galvano mirror 104 by the respective image forming optical system 130, 132 and 134. Then, laser beams LR, LG, LB are color-mixed on the light reflection surface 105.

In the similar way of the first embodiment, the galvano mirror 104 rotates by an angular velocity corresponding to the modulation frequency of the DMD 124, 126, and 128.

The color laser beam LM in which the laser beams LR, LG and LB are mixed is reflected toward the screen 136 by the galvano mirror 104, and the color laser beam LM is deflected so as to scan along the sub scanning direction. This color laser beam LM is projected on the image display surface 137 of the screen 136 through the Fresnel lens 106, and a color image is displayed.

Three types of luminophors, which emit a red light, a green light and a green light respectively when the color laser beam LM is irradiated thereon, are provided in a disperse-manner every each display pixel. Here, for example, as the three types of luminophors, which emit a red light, a green light and a green light respectively, ZnCdS:Ag is used as a red light luminophors, ZnS:Cu is used as a green light luminophors, and ZnS:Ag is used as a blue light luminophors.

In the similar way of the first embodiment the DMD 124, 126 and 128 is each disposed in a slightly inclining manner such that a short side (column direction) of the DMD 124 (126, 128) is slightly inclined with respect to the sub scanning direction (horizontal direction) in the screen 136 by a predetermined angle $\theta_I$ (for example, 0.1°–0.5°). As the result, a pitch of the scanning loci (the scanning lines) of the laser beams L by respective micro mirrors in a case in which the DMD 124 (126, 128) is inclined is narrower than a pitch of the scanning loci (the scanning lines) in a case in which the DMD 124 (126, 128) is not inclined. Therefore, a resolution can be much improved in the case in which the DMD124 (126, 128) is inclined. Further, substantially same positions (dots) on the same main scanning line are scanned in a multiple manner (multiplex-scanned) by a plurality of micro mirrors on the different columns. As the result, due to the multiplex scanning, even if one of the micro mirror (some of micro mirrors) in the DMD124 (126, 128) has a defect such as an operation-NG or the like, an image defect on a display image caused by defect of a micro mirror can not be conspicuous (stand out).

(A Third Embodiment)

Figure 20:
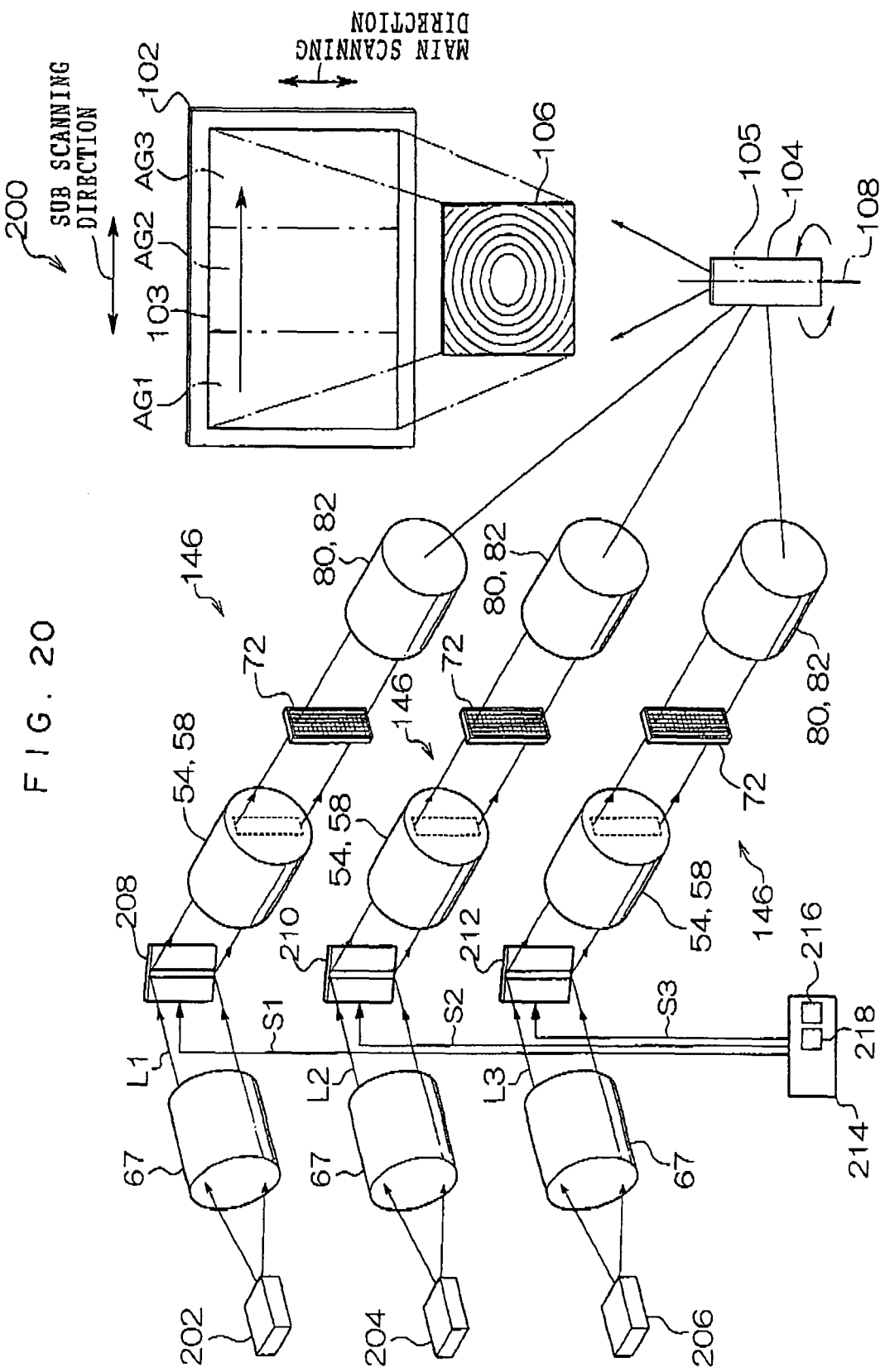
FIG. 20 is a perspective view illustrating the structure of a laser display device related to a third embodiment of the present invention.

Next, description will be given of a laser display device 200 pertaining to a third embodiment of the invention. The laser display device 200 pertaining to the third embodiment of the invention is shown in FIG. 20. The laser display device 200 is a projector device in which an image display surface 103 of a screen 102 is directly scanned by laser beams L1, L2 and L3 (indicated below as "L1 to L3") that are respectively modulated by the DMDs 208, 210 and 212, to the by project and display an image on the image display surface 103. The laser display device 200 is configured as a device particularly suited for displaying a moving image. It should be noted that, in the laser display device 200 pertaining to the third embodiment, portions shared in common with those of the laser display device 100 pertaining to the first embodiment will be given the same reference numerals and description of those portions will be omitted.

As shown in FIG. 20, three fiber array light sources 202, 204 and 206 are disposed, as light source devices of the laser beams L1 to L3, in the laser display device 200. Illumination optical systems 67, the DMDs 208, 210 and 212 and imaging optical systems 146 are respectively disposed on the optical paths of the laser beams L1 to L3 that are emitted from these fiber array light sources 202, 204 and 206. Here, the fiber array light sources 204, 204 and 206 and the DMDs 208, 210 and 212 in the laser display device 200 have configurations in common with those of the fiber array light source 66 and the DMD 50 pertaining to the first embodiment except that the former are respectively independent and disposed per laser beam L1 to L3. It should be noted that the light source devices may be configured so that a laser beam emitted from a single fiber may light source is dispersed into the three laser beams L1, L2 and L3 by a dispersion element such as a half mirror and the laser beams L1, L2 and 13 are respectively irradiated onto the DMDs 208, 210 and 212.

In the laser display device 200, the laser beam L1 to L3 emitted from the three fiber array light sources 202, 204 and 206 are respectively made incident at the DMDs 208, 210 and 212 through the illumination optical systems 67 and respective modulated by the DMDs 208, 210 and 212. At this time, control signals S1, S2 and S3 that correspond to respectively different image data are inputted to the DMDs 208, 210 and 212 from a controller 214 described. The DMDs 208, 210 and 212 modulate the laser beams L1 to L3 to respectively different states in accordance with the control signals S1, S2 and S3. The laser beams L1 to L3 modulated by the DMDs 208, 210 and 212 are respectively imaged on a light-reflective surface 105 of a galvano mirror 104 by the imaging optical systems 146.

Similar to the case of the first embodiment, the galvano mirror 104 is rotated at an angular speed corresponding to the modulation frequency of the DMDs 208, 210 and 212, reflects the laser beams L1 to L3 modulated by the DMDs 208, 210 and 212 in the direction of the screen 102, and deflects the laser beams L1 to L3 at a predetermined subscanning speed along the subscanning direction. The laser beans L1 to L3 are projected through a Fresnel lens 106 towards respectively differently display regions AG1, AG2 and AG3 in the image display surface 103 of the screen 102 to display images in the display regions AG1, AG2 and AG3.

The laser display device 200 is disposed with the controller 214 for receiving control signals and image signals from a central control section of the device and controlling the image display operation. The DMDs 208, 210 and 212 and the galvano mirror 104 are controlled by the controller 214. The controller 214 is disposed with a data processing section 216 and a mirror driving control section 218. When image data of one frame is inputted to a frame memory, the controller 214 divides the image data of the one frame into three kinds of partial image data respectively corresponding to the display regions AG1, AG2 and AG3, and outputs the three kinds of partial image data to the data processing section 216. The data processing section 216 generates three kinds of control signal S1, S2 and S3 on the basis of the three kinds of inputted partial image data and outputs the control signals S1, S2 and S3 to the mirror driving control section 218.

The mirror driving control section 218 respectively outputs the control signals S1, S2 and S3 generated by the data processing section 216 to the DMDs 208, 210 and 212. Thus, the micromirrors 62 (see FIG. 10) disposed in the region to be controlled in each DMD 208, 210 and 212 are controlled to either an ON state or an OFF state. At this time, the width along the subscanning direction of the region to be controlled of each DMD 208, 210 and 212 is as substantially the same as that of the region to be controlled of the DMD 50 pertaining to the first embodiment. However, the number of control-times per unit time with respect to the micromirrors 62 controlled by the control signals S1, S2 and S3 are substantially ⅓ of the number of control of the micromirrors 62 in the DMD 50 pertaining to the first embodiment.

Next, description will be given of the action of the laser display device 200 pertaining to the third embodiment configured as described above.

When the controller 214 receives an image display signal, the controller 214 respectively drives the fiber array light sources 202, 204 and 206, successively reads line image data per respectively plural lines from the three kinds of partial image data in the frame memory, and outputs the line image data to the data processing section 216. The data processing section 216 generates the control signals on the basis of the three kinds of line image data and outputs the control signals to the mirror driving control section 218. Then, the micromirrors 62 of each DMD 208, 210 and 212 are respectively controlled, by the mirror driving control section 218, to the ON state or the OFF state on the basis of the three kinds of generated control signals S1, S2 and S3.

When an image of one frame is to be displayed on the screen 102, the controller 214 generates, from the image data of the one frame, the partial image data respectively corresponding to the display regions AG1, AG2 and AG3, and outputs, per pixel modulating period from the frame memory to the data processing section 216, the line image data respectively read from the partial image data.

The data section 216 generates the control signals per pixel modulating period on the basis of the line image data and outputs the control signals to the mirror driving control section. The controller 214 uses the mirror drive control unit 218 to respectively control the optically modulated state of each micromirror 62 in the three DMDs 208, 210 and 212 on the basis of the three kinds of control signals. Thus, the laser beams L1, L2 and L3 respectively modulated by the DMDs 208, 210 and 212 are made incident at the galvano mirror 104 at respectively different angles of incidence, are respectively reflected by the galvano mirror 104 to the display regions AG1, AG2 and AG3, and are deflected along the subscanning direction so as to scan (subscan) the display regions AG1, AG2 and AG3 at a subscanning speed corresponding to the pixel modulating period. Thus, images corresponding to the respective partial image data are simultaneously displayed on the display regions AG1, AG2 and AG3 within a period of time corresponding to the pixel modulating period.

The controller 214 repeats the above-described control per pixel modulating period, which is a period where the image displayed on the screen 102 is updated to a new image, whereby a moving image is displayed on the screen 102 by the laser beams L1, L2 and L3 modulated by the DMDs 208, 210 and 212.

In the laser display device 200 pertaining to the present embodiment described above, the laser beams L1, L2 and L3 emitted from the fiber array light sources 202, 204 and 206 are respectively irradiated onto the three DMDs 208, 210 and 212, whose optically modulated states are respectively changed in accordance with the three kinds of partial image data corresponding to the display regions AG1, AG2 and AG3, the plural laser beams L1, L2 and L3 (in actuality, light beam groups that are a set of light beams modulated by the micromirror 62) respectively modulated by the three DMDs 208, 210 and 212 are deflected along the subscanning direction by the galvano mirror 104, and the three display regions AG1, AG2 and AG3 in the image display surface 103 of the screen 102 are successively scanned by the three laser beams L1, L2 and L3. Thus, the number of display pixels along the subscanning direction included in one of the display regions AG1, AG2 and AG3 scanned by the corresponding laser beams L1, L2 and L3 modulated by the corresponding DMD 208, 210 or 212 of the three DMDs becomes substantially ⅓ the entire number of display pixels along the subscanning direction included in the entire image display surface 103. Therefore, the number of modulating times per unit time with respect to the micromirrors 62 used in modulating one of the laser beams L1, L2 and L3 in the one of the DMD 208, 210 and 212 becomes substantially ⅓ in comparison to the case where an image is displayed on the entire image display surface 103 using only the single DMD 50 as in the laser display device 100 of the first embodiment. Therefore, each pixel modulation period of the micromirrors 62 of each DMD 208, 210 and 212 can be substantially tripled in average.

As a result, according to the laser display device 200 pertaining to the present embodiment, in an image can be modulated, while realizing high definition of a display image, in a shorter period of time than a pixel modulating period obtained by the specific pixel modulating period that each DMD 208, 210 and 212 has. That is, an image can be displayed at a first frame rate (about three times faster) than the frame rate obtained by the pixel modulating period that each DMD 208, 210 and 212 has.

In the laser display device 200 pertaining to the present embodiment, the image display surface 103 in the screen 102 was divided into free equal regions along the subscanning direction, and the divided regions were respectively designated as the display regions AG1, AG2 and AG3. However, the display regions AG1, AG2 and AG3 may also be set to partially overlap in the subscanning direction. By making parts of the display regions AG1, AG2 and AG3 overlap in this manner, the seams between each display region AG1, AG2 and AG3 can be made inconspicuous and an image (moving image) of higher quality can be obtained.

Also, in the laser display device 200 pertaining to the present embodiment, the divisional number of the image display surface 103 was three, and the three display regions AG1, AG2 and AG3 were set. However, it suffices as long as the divisional number of the image display surface 103 and the number of DMDs equal to the divisional number are two or more. By increasing this divisional number and the number of DMDs, it becomes possible to respectively accommodate an increase in the frame rate and an increase in the number of pixels (resolution) along the subscanning direction in the display image, even if the pixel modulating period of each DMD is constant. Thus, the divisional number and the number of DMDs may be set in accordance with the frame rate and resolution along the subscanning direction demanded of the display image.

Furthermore, description was given of a case where the laser display device 200 pertaining to the present embodiment was a device that displays a monochrome image including a light some (GaN semiconductor laser) of a single color. However, as in the display device 110 pertaining to the second embodiment by disposing DMDs of N number (e.g., three each) per the three color laser beams (of red, green and blue) and successively scanning N number of display regions with the laser beams respectively modulated by the N number of DMDs corresponding to a certain color, the pixel modulating period of the N number of DMDs can be substantially tripled in comparison to the case where, as in the display device 100 of the first embodiment, an image is displayed on the entire image display surface 103 using only the single DMD 50. Thus, an image can be displayed at a faster frame rate than the frame rate obtained by the pixel modulating period that each DMD has, while realizing full-colorization of a high-definition display image.

(Fourth Embodiment)

Figure 21:
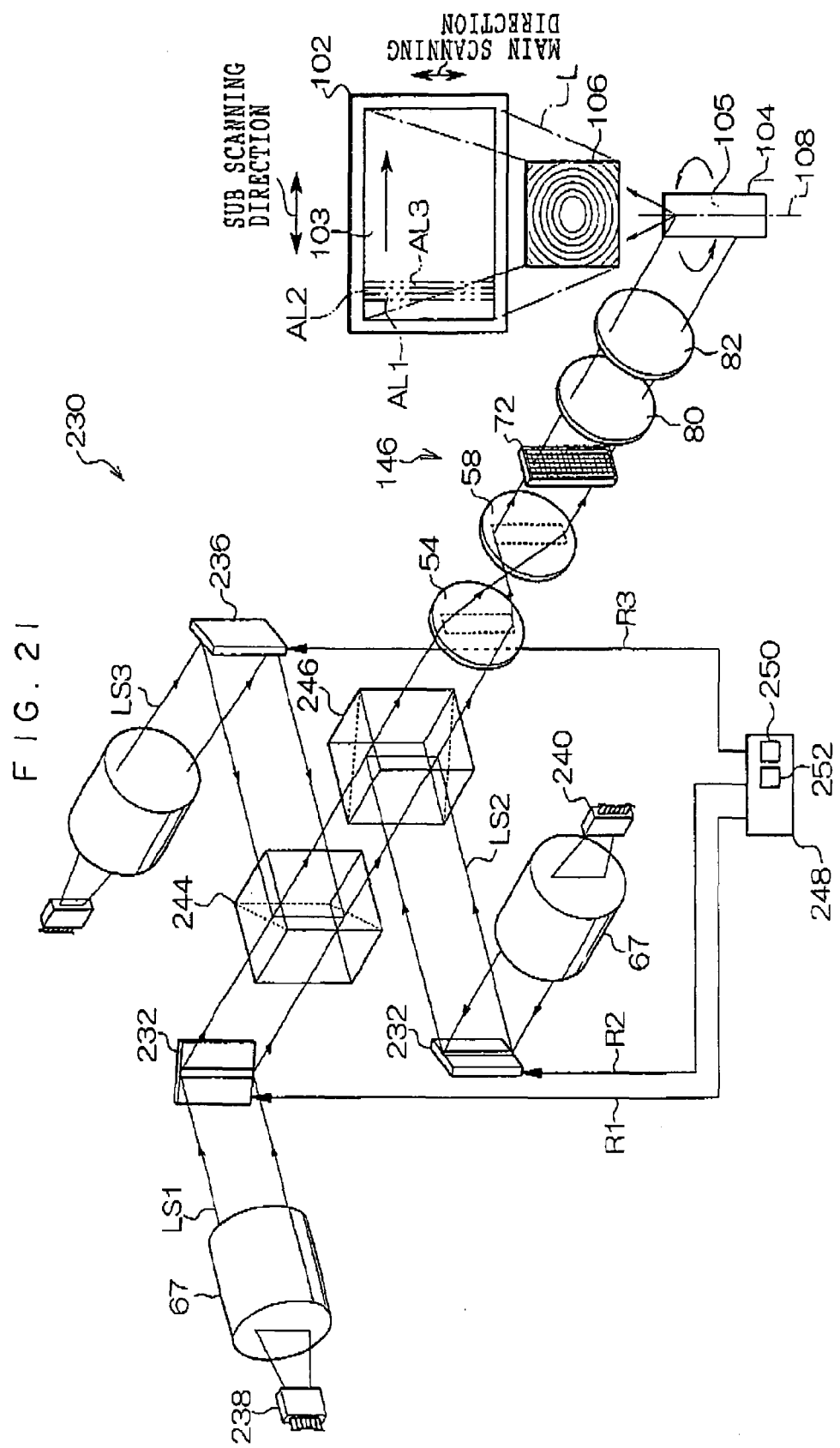
FIG. 21 is a perspective view illustrating the structure of a laser display device related to a fourth embodiment of the present invention.

Next, description will be given of laser display device 230 pertaining to a fourth embodiment of the invention. The laser display device 230 pertaining to the fourth embodiment of the invention is shown in FIG. 21. Similar to the laser display device 200 of the third embodiment, the laser display device 230 is a projector device in which the image display surface 103 of the screen 102 is directly scanned by laser beams LS1, LS2 and LS3 (indicated below as "LS1 to LS3") that are respectively modulated by three DMDs 232, 234 and 236, to thereby project and display an image on the image display surface 103. The laser display device 230 is configured as a device particularly suited for displaying a moving image.

As shown in FIG. 21, three fiber array light sources 238, 240 and 242 are disposed, as light source devices of the laser beams L1 to L3, in the laser display device 230. These fiber array light sources 238, 240 and 242 basically have the common structure of the fiber array light source 66 relating to the first embodiment. However, these fiber array light sources 238, 240 and 242 have the structure as electronic flash light sources in which emission (electronic flash emission) of constant intensity within a predetermined very short emission time (for example, 1.3 μs) is possible. Illumination optical systems 67, and the DMDs 232, 234 and 236 are respectively disposed on the optical paths of the laser beams LS1 to LS3 that are emitted from these fiber array light sources 238, 240 and 242.

Here, the DMD 232 modulates the laser beam LS1 such that the optical axis of the laser beam LS1 agrees with the the optical axis of the imagining optical system 146. Further, the laser bean LS2 modulated by the DMD 234 intersects with the optical axis of the imaging optical system 146 between the DMD 232 and the imaging optical system 146. Further, the laser beam LS3 modulated by the DMD 236 intersects with the optical axis of the imaging optical system 146 between the DMD 232 and the imaging optical system 146 at the side of the imaging optical system 146 with respect to the laser beam LS2 (at the upstrean side of the optical path).

In the laser display device 230, a first half 244 is disposed at a position at which the optical axis of the imaging optical system 146 and the optical axis of the laser beam LS3. The first half mirror 244 is structured such that the laser beam LS1 does not deflect at the first half mirror 244 but transmits through the first half mirror 244 toward the side of the imaging optical system 146. Together with this, the first half mirror 244 is structured such that the laser beam LS3 is deflected orthogonally at the first half mirror 244 and outgoes toward the side of the imaging optical system 146 such that the optical axis of the imaging optical system 146 agrees with the optical axis of the laser beam LS3.

Further, in the laser display device 230, a second half mirror 246 is disposed at a position at which the optical axis of the imaging optical system 146 and the optical axis of the laser beam LS2. The second half mirror 246 is structured such that the laser beams LS1 and LS3 do not deflect at the second half mirror 244 but transmit through the first half mirror 244 toward the side of the imaging optical system 146. Together with this, the first half mirror 244 is structured such that the laser beam LS3 is deflected orthogonally at the second half mirror 246 and outgoes toward the side of the imaging optical system 146 such that the optical axis of the imaging optical system 146 agrees with the optical axis of the laser beam LS2.

Thus, in the laser display device 230, the laser beams LS1 to LS3 emitted from three fiber array light sources 238, 240 and 242 are respectively made incident at the DMDs 232, 234 and 236 through the illumination optical systems 67, and the laser beams LS1 to LS3 respectively modulated by the DMDs 232, 234 and 236 are made incident at the imaging optical system 146 through a first half mirror 244 and a second half mirror 246 or the second half mirror 246.

At this line control signals R1, R2 and R3 that correspond to respectively different line image data are inputted to the DMDs 232, 234 and 236 from a controller 248 described later. The DMDs 232, 234 and 236 modulate the laser beams LS1 to LS3 to respectively different states in a accordance with the control signals R1, R2 and R3. The laser bean LS1 to LS3 modulated by the DMDs 232, 234 and 236 are respectively imaged on the light-reflective surface 105 of the galvano mirror 104 by the imaging optical system 146. Together with this, the laser beams LS1 to LS3 are combined to a single laser beam L on the light-reflective surface 105.

Similar to the case of the first embodiment, the galvano mirror 104 is rotated at an angular speed corresponding to the modulation frequency of the DMDs 232, 234 and 236, and the galvano mirror 104 reflects the laser beam L toward a direction of the screen 102. Together with this, the laser beam L is deflected a predetermined subscanning speed along the subscanning direction. The laser beam L transmit through the Fresnel lens 106 and projected in the image display surface 103 of the screen 102 to display image on the image display surface 103.

The laser display device 230 is provided with the controller 248 for receiving control signals and a signals from the central control section of the device and controlling the image display operation. The fiber array light sources 238, 240 and 242, the DMDs 232, 234 and 236 and the galvano mirror 104 are controlled by the controller 248. The controller 248 is disposed with a data processing section 250 and a mirror driving control section 252. When image data of one frame is inputted to a frame memory, the controller 248 divides the image data of the one frame into three kinds of line image data respectively corresponding to the line regions AL1, AL2 and AL3, and outputs the three kinds of line image data to the data processing section 250. The data processing section 250 generates three kinds of line control signals R1, R2 and R3 on the basis of the tree kinds of inputted line image data and outputs the control signals R1, R2 and R3 to the mirror driving control section 252.

The mirror driving control section 252 respectively outputs the line control signals R1, R2 and R3 generated by the data processing section 250 to the DMDs 232, 234 and 236 at a predetermined modulating period T. Here, the modulating period T is a time calculated by ($T_L \times M$) in a case where there is a line modulating period $T_L$ of each main scanning line configuring a display image, and the number of DMDs 232, 234 and 236, which are two-dimensional space optical modulation elements, is M (=3). Thus, of the micromirors 62 (see FIG. 10) disposed in the region to be controlled in each DMD 232, 234 and 236, the plural microns 62 arranged in the main scanning direction are controlled to either the ON state or the OFF state, and this optically modulated state is changed by the modulating period T. In this case, the micromirrors 62 whose optically modulated state is changed by the line control signals R1, R2 and R3 and not limited to micromirrors arranged in one row along the main scanning direction. In a case where one main scanning line is multiply scanned by plural micromirors 62, the optically modulated states of the micromirrors 62 included in rows of a number equal to the number of multiple scans are simultaneously changed by the line control signals R1, R2 and R3.

Next, description will be given of the action of the laser display device 230 pertaining to the fourth embodiment configured as described above.

When the controller 248 receives the image display signal, the controller 248 respectively drives the fiber array light sources 238, 240 and 242 at the modulating period T so that they successively emit light for a time substantially equal to the line modulating period $T_L$ or a time that is slightly shorter than the line modulating period $T_L$, successively reads the line image data per respective line from the three kinds of line image data stored in the frame memory, and outputs the line image data to the data processing section 250. The data processing section 250 generates the line control signals on the basis of the three kinds of line image data and outputs the control signals to the mirror driving control section 252.

Then, as shown in the timing chart of FIG. 22, the micromirrors 62 arranged in the main scanning direction of each DMD 232, 234 and 236 are respectively controlled, by the mirror driving control section 252, to the ON state or the OFF state on the basis of the three kinds of generated line control signals R1, R2 and R3. As shown in the timing chart of FIG. 22, the data contents of the line control signals R1, R2 and R2 are respectively updated at the modulating period $T_L$ and, in synchronization with the updating of the data contents, the optically modulated states of the micromirrors 62 arranged along the main scanning direction of each DMD 232, 234 and 236 are also updated.

Also, as shown in FIG. 22, each fiber array light source 238, 240 and 242 successively emits light at the modulating period T for a time substantially equal to the line modulating period $T_L$. Thus, the laser beams LS1 to LS3 are successively irradiated onto the DMDs 232, 234 and 236 for the time substantially equal to the line modulating period $T_L$. Therefore, when the fiber array lights 238, 240 and 242 are thought of as a single light source device, this light source device successively emits the laser beams LS1 to LS3 in synchronization with the line modulating period $T_L$ using the fiber array light source 238, 240 and 242. The DMDs 232, 234 and 236 respectively modulate the laser beams LS1 to LS3 in accordance with the line control signals R1, R2 and R3. The laser beams LS1 to LS3 modulated by the DMDs 232, 234 and 236 are successively made incident at the galvano mirror 104 at a timing shifted by the line modulating period $T_L$ and combined to the single laser beam L on the light reflection surface 105. Together with this, due to the laser beam L being deflected by the galvano mirror 104, the laser beam L scans (sub scans) on the image display surface 103 of the screen 102 to display image corresponding to image data of one frame on the image display surface 103.

After display of an image of one frame has been completed, the controller 248 repeats the above-described control per pixel modulating period, which is a period where the image displayed on the screen 102 is updated to a new image, whereby a moving image is displayed on the screen 102 by the beams LS1, LS2 and LS3 modulated by the DMDs 232, 234 and 236.

In the laser display device 230 pertaining to the present described above, the laser beams LS1 to LS3 strobe (electronic flash)—emitted by the fiber array light sources 238, 240 and 242 in synchronization with the line modulating period $T_L$ are successively irradiated onto the three DMDs 232, 234 and 236, the laser beams LS1 to LS3 successively modulated by the micromirrors 62 arranged along the main scanning direction whose optically modulated states are changed at the modulating period T in the three DMDs 232, 234 and 236 are combined (synthesized) to the single laser beam L by the galvano mirror 104, and the screen 102 is scanned by the laser beam L. Thus, because the laser beams LS1 to LS3 modulated by the three DMDs 232, 234 and 236 are combined (synthesized) to the single laser beam L, and the screen 102 is scanned (projected) to display the image, the pixel modulating period of the mirror 62 arranged along the subscanning direction corresponding to one main line in each DMD 232, 234 and 236 can be tripled in comparison to the case where an image is displayed on the entire screen 102 using only the single DMD 50 as in the case of the first embodiment.

As a result, according to the laser display device 230 pertaining to the present embodiment, an image can be modulated, while realizing high definition of a display image, in a shorter period of time than a pixel modulating period obtained by the specific pixel modulating period that each DMD 232, 234 and 236 has. That is, an image can be displayed at a faster frame rate (about three times faster) than the frame rate obtained by the specific pixel modulating period that each DMD 232, 234 and 236 has.

In the laser display device 230 pertaining to the present embodiment, the three line regions AL1, AL2 and AL3 were set in the subscanning direction on the image display surface 103 in the screen 102 and an image was displayed using the three DMDs 232, 234 and 236 so that they respectively correspond to the three regions AL1, AL2 and AL3. However, it suffices as long as the setting number of line regions and the number of DMDs equal to the setting number are two or more. By increasing this setting number of line regions and the number of DMDs, it becomes possible to respectively accommodate an increase in the frame rate and an increase in the number of pixels (resolution) along the subscanning direction in the display image, even if the pixel modulating period of each DMD is constant. Thus, the divisional number may be set in accordance with the frame rate and resolution along the subscanning direction demanded of the display image.

As the display devices relating to the first to the fourth embodiments, the display devices comprising the DMD as the two dimensional spatial modulation element have bee explained. However, for example, a liquid crystal light shutter array or an optical shutter array in which spatial modulation elements of an interference type are arranged in a two dimensional manner, can be used. Here, an optical modulation element (an interference type optical shutter) in which Fabry-Perot interference is used can be used as the spatial modulation element of the interference type.

Figure 17:
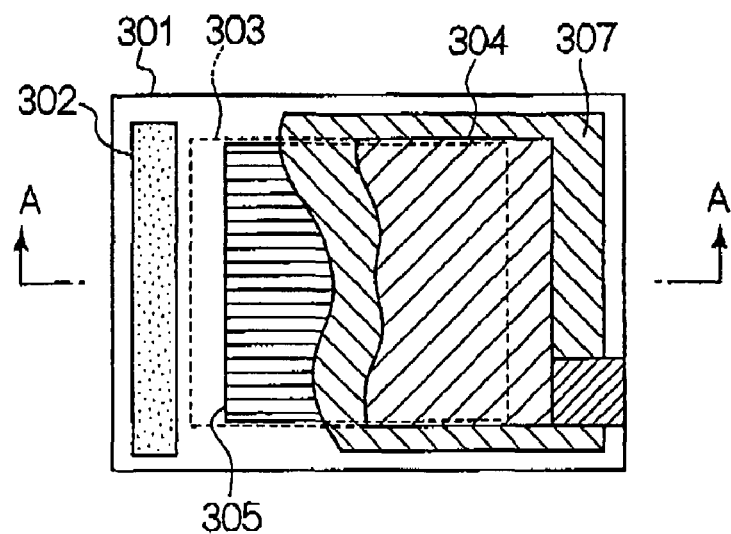
FIG. 17 is a plane view illustrating an example of a spatial modulation element of an interference-type.
Figure 18:
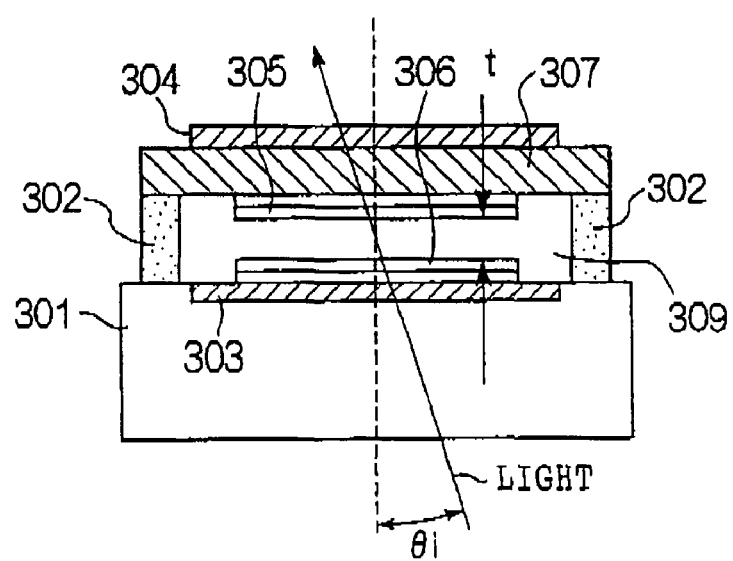
FIG. 18 is a side view illustrating an example of the spatial modulation element of the interference-type.

Referring to FIGS. 17, 18 and 19A and 19B, this interference type optical shutter will be described hereinafter. As shown in FIGS. 17 and 18, the interference type optical shutter is provided with an electrode (an one of the electrodes) 303, an electrode (another of the electrodes) 304, and a flexible thin plate 307. The one of the electrodes 303 is disposed so as to have a predetermined angle with respect to an incident light. The other of the electrodes 304 and the one of the electrodes 303 face each other so as to have at least a space therebetween. The flexible thin plate 307 is disposed between the other of the electrodes 304 and the one of the electrodes 303, and is transparent. The flexible thin plate 307 is deflected (warped) by Coulomb force generated by applying voltage between the other of the electrodes 304 and the one of the electrodes 303. A light transmitted through the deflected flexible thin plate 307 is modulated, and modulated light is emitted.

The one of the electrodes 303 is mounted on a transparent substrate (base plate) 301, and a dielectric multi-layers mirror 305 is disposed at the upper side of the one of the electrodes 303. Further, supports 302 are provided on the transparent substrate 301 at left and right sides thereof. The flexible thin plate 307 is provided on upper end surfaces of the respective supports 302. Another dielectric multi-layers mirror 306 is provided at a lower surface facing the dielectric multi-layers mirror 305 of the flexible thin plate 307.

Accordingly, a space 309 is formed between the two dielectric multi-layers mirrors 305 and 306 which are positioned at an upper position and a lower position. Further, the other of the electrodes 304 is provided on an upper surface of the flexible thin plate 307 so as to face the one of the electrodes 303.

In the interference type optical shutter constructed in such a manner mentioned above, as shown in a state in FIG. 19A, in a case in which applying of a power voltage Vgs between the other of the electrodes 304 and the one of the electrodes 303 is OFF, an interval of the space 309 formed between the two dielectric multi-layers mirrors 305 and 306 positioned at the upper position and the lower position is t off. On the other hand, as shown in state in FIG. 19B, in a case in which applying of a power voltage Vgs between the other of the electrodes 304 and the one of the electrodes 303 is ON, an interval of the space 309 formed between the two dielectric multi-layers mirrors 305 and 306 positioned at the upper position and the lower position is t on. That is, when the voltage Vgs is applied between the other of the electrodes 304 and the one of the electrodes 303, the interval of the space 309 becomes narrow due to that the flexible thin plate 307 is deflected by the generated Coulomb force.

Here, t off is adjustable when manufacturing of the flexible thin plate 307. Further, controlling of t on is possible due to balancing the applied voltage Vgs and a restoring force generated when the flexible thin plate 307 is deformed. A spacer member may be formed between the electrode 303 and the flexible thin plate 307 in order that a displacement becomes constant. In a case in which the spacer is an insulator, there is an effect in that the applied voltage can be reduced due to a relative dielectric constant (more than or equal to 1) of the spacer. Further, in a case in which the spacer has a conductivity, the effect becomes greater. The electrodes 303 and 304, and the spacer can be made from the same material.

As shown in FIG. 18, in a case in which an angle between a surface normal of the optical shutter and the incident light is θi, a light intensity transmittance $I_t$ of the interference type optical shutter is given by the following formula. In this formula, R is a light intensity reflectance of the dielectric multi-layers mirrors 305 and 306, n is a refractive index of the space 309 (in a case of an air, 1), t is an interval (distance) of the space 309 between the dielectric multi-layers mirrors 305 and 306, and λ is a wavelength of light.

$$It = \frac{1}{1 + 4R\sin^2\left[\frac{2\pi n t \cos\theta_i}{\lambda}\right]} \frac{1}{(1-R)^2}$$

Here, t on and t off are set as follow (m=1). t on=½×λ (nm), t off=¾×λ(nm), λ=405 nm. Further, the light intensity reflectance (of the dielectric multi-layers mirrors 305 and 306) R=0.9, the incident light θi=0 (deg), and the refractive index (at the space 309) n=1 (a gas in the space 309 is an air or a rare gas). The characteristic of the light intensity transmittance with respect to wavelength in the interface type optical shutter is that, a light is not transmitted through the shutter at all in a case in which voltage Vgs is not applied (in a case of t off), and a light, whose wavelength is in a wavelength-region around the wavelength of the semiconductor laser light 405 (nm), is transmitted through the shutter in a case in which voltage Vgs is applied (in a case of t on).

In the interference type optical shutter, the flexible thin plate 307 is deflected by the Coulomb force generated by applying the voltage Vgs between the other of the electrodes 304 and the one of the electrodes 303, and a light transmitted through the flexible thin plate 307 can be modulated due to that multi-layer interference (effect) is generated. Note that the light intensity reflectance of the dielectric multi-layers mirrors 305 and 306 R, the refractive index of the space 309 n, the interval of the space 309 t and the like can be changed whenever interference condition is satisfied (any suitable combination of R, n, t and the like can be used). Further, when the space t is changed continuously by varying the voltage Vgs, a central wavelength of the transmit-spectrum can be changed optionally. As the result, transmit-light amount can be continuously controlled. That is, step controlling by the applied voltage can be carried out.

In the optical shutter array in which the above mentioned interference type optical shutters are arranged in row direction and column direction corresponding to the main scanning direction and the sub scanning direction respectively in a two dimensional manner, in the same way of the first and the second embodiments, a resolution can be improved much, and even if some of the interference type optical shutters have defect, an image defect of the display image caused by defect of the interference type optical shutter is made non-conspicuous, by at least the column direction in the arrangement directions of the interfere type optical shutters being inclined with respect to the sub direction by a predetermined inclining-angle $\theta_I$ Further, in the display devices relating to the first to the fourth embodiments, the laser beams L and LM are irradiated on the image display surfaces 103 and 137 of the screens 102 and 136, and images are displayed by reflection light from the image display surfaces 103 and 137 and emissions form luminophors. However, the present invention is not limited to the same. It is possible to apply the feature of the present invention to a laser display device of back-projection type in which the laser beams L and LM are irradiated on back surfaces of the image display surfaces of display panels, and images are displayed by transmitting light to transmitted trough the display panels. In this case, the effect which is the same as those of the first to the fourth embodiments can be obtained.

As mentioned above, in the display device of the present invention, increasing of number of spatial light modulation elements and increasing of number of pixels can be suppressed, and high definition of a display image is easily realized. Further, manufacture cost of the device can be suppressed. Further, an image can be displayed with a frame rate which is higher-speed (faster) than a frame rate obtained from the inherent pixel modulation period of the spatial light modulation element while high definition of a display image can also be realized.

What is claimed is:
1. A display device comprising:
   a light source section which emits a light beam;
   a spatial light modulation element in which a plurality of pixel portions, each of whose state related to light modulation is changed in accordance with an image signal, are arranged in a two dimensional manner, and which modulates, every each pixel portion, the light beam incident to the plurality of pixel portions from the light source;
   an image forming optical system for imaging the light beam, including a pixel size adjustment section in which a plurality of beam reduction portions are arranged in a two dimensional manner correspondingly to the plurality of pixel portions, a diameter of the light beam modulated by the pixel portion being reduced by the beam reduction portion corresponding to the pixel portion; and a scanning section, by deflecting a group of the light beams whose diameters are reduced by the pixel size adjustment section in a sub scanning direction, which scans a surface to be scanned of an image display body with the group of the light beams, wherein the plurality of pixel portions are arranged along a column direction and a row direction corresponding to the sub scanning direction and a main scanning direction orthogonal to the sub scanning direction respectively, at least the column direction being inclined with respect to the sub scanning direction by a predetermined inclining-angle, and the inclining-angle is set in accordance with a scanning density of the light beam in the main scanning direction on the surface to be scanned.

2. The display device of claim 1, wherein the inclining-angle is set such that light beams modulated by a plurality of the pixel portions are scanned on the same position on the surface to be scanned.

3. The display device of claim 1, wherein the light source section comprises a red laser light source device which emits a red laser beam, a green laser light source device which emits a green laser beam, and a blue laser light source device which emits a blue laser beam, and the red laser beam, the green laser beam and the blue laser beam, emitted from the red laser light source device, the green laser light source device and the blue laser light source device, respectively, are modulated by a plurality of spatial light modulation elements, respectively.

4. The display device of claim 2, wherein the light source section comprises a red laser light source device which emits a red laser beam, a green laser light source device which emits a green laser beam, and a blue laser light source device which emits a blue laser beam, wherein the red laser beam, the green laser beam, and the blue laser beam, emitted from the red laser light source device, the green laser light source device, and the blue laser light source device, respectively, are modulated by a plurality of spatial light modulation elements, respectively.

5. The display device of claim 1, wherein the light source section is a laser light source device, in which GaN semiconductor laser is used as a light source of the laser light source device, and which emits a laser beam whose wavelength is in 400 nm band, and an emission type screen, provided with a luminophor, which displays an image, is used as the image display body, the luminophor emitting a white light by the laser beam whose wavelength is in 400 nm band being irradiated thereon.

6. The display device of claim 2, wherein the light source section is a laser light source device, in which GaN semiconductor laser is used as a light source of the laser light source device, and which emits a laser beam whose wavelength is in 400 nm band, and an emission type screen, provided with a luminophor, which displays an image, is used as the image display body, the luminophor emitting a white light by the laser beam whose wavelength is in 400 nm band being irradiated thereon.

7. The display device of claim 1, wherein the light source section is a laser light source device, in which GaN semiconductor laser is used as a light source of the laser light source device, and which emits a laser beam whose wavelength is in 400 nm band, and a luminophor screen, provided with a red luminophor, a green luminophor, and a blue luminophor at each display pixel, is used as the image display body, the red luminophor emitting a red light, the green luminophor emitting a green light, and the blue luminophor emitting a blue light, by the laser beam whose wavelength is in 400 nm band being irradiated thereon.

8. The display device of claim 2, wherein the light source section is a laser light source device, in which GaN semiconductor laser is used as a light source of the laser light source device, and which emits a laser beam whose wavelength is in 400 nm band, and a luminophor seen, provided with a red luminophor, a green luminophor, and a blue luminophor at each display pixel, is used as the image display body, the red luminophor emitting a red light, the green luminophor emitting a green light, and the blue luminophor emitting a blue light, by the laser beam whose wavelength is in 400 nm band being irradiated thereon.

9. The display device of claim 1, wherein the spatial light modulation element is a two dimensional spatial light modulation element in which a plurality of pixel portions enabling light modulation are arranged in a two dimensional manner, and the light beam emitted from the light source section is modulated by using only a part of the pixel portions of the two dimensional spatial light modulation element.

10. The display device of claim 2, wherein the spatial light modulation element is a two dimensional spatial light modulation element in which a plurality of pixel portions enabling light modulation are arranged in a two dimensional manner, and the light beam emitted from the light source section is modulated by using only a part of the pixel portions of the two dimensional spatial light modulation element.

11. The display device of claim 1, wherein the spatial light modulation element is a digital micro mirror device in which a plurality of micro mirrors, each of whose angle of a reflection surface is changable m accordance with an image signal, are arranged in a two dimensional manner on a substrate thereof, and the light beam emitted from the light source section is modulated by using only a part of the micro mirrors of the digital micro mirror device.

12. The display device of claim 2, wherein the spatial light modulation element is a digital micro mirror device in which a plurality of micro mirrors, each of whose angle of a reflection surface is changable in accordance with an image signal, are arranged in a two dimensional manner on a substrate thereof, and the light beam emitted from the light source section is modulated by using only a part of the micro mirrors of the digital micro mirror device.

13. The display device of claim 1, wherein the spatial light modulation element is an optical shutter array in which interference type optical shutters are arranged in a two dimensional manner, the interference type optical shutter comprising:

an one of electrodes, disposed to have a predetermined angle with respect to the light beam incident thereto from the light source section, another of the electrodes, which faces the one of the electrodes, and a flexible thin plate which is disposed between the other of the electrodes and the one of the electrodes, and which is transparent, wherein the flexible thin plate is deformed due to coulomb force generated by applying voltage between the other of the electrodes and the one of the electrodes, and the light beam is modulated by one of the light beam being transmitted through the flexible thin plate or the light beam being reflected by the flexible thin plate.

14. The display device of claim 2, wherein the spatial light modulation element is an optical shutter array in which interference type optical shutters are arranged in a two dimensional manner, the interference type optical shutter comprising:

an one of electrodes, disposed to have a predetermined angle with respect to the light beam incident thereto from the light source section, another of the electrodes, which faces the one of the electrodes, and a flexible thin plate which is disposed between the other of the electrodes and the one of the electrodes, and which is transparent, wherein the flexible thin plate is deformed due to coulomb force generated by applying voltage between the other of the electrodes and the one of the electrodes, and the light beam is modulated by one of the light beam being transmitted through the flexible thin plate or the light beam being reflected by the flexible thin plate.

15. A display device comprising:

a light source section which emits a light beam;

an image forming optical system for imaging the light beam;

a spatial light modulation element in which a plurality of pixel portions changed in accordance with an image signal, are arranged in a two dimensional manner, and which modulates, every each pixel portion, the light beam incident to the plurality of pixel portions from the light source; and a scanning section, which scans a surface to be scanned of an image display body with the light beam modulated by the spatial light modulation element, wherein the plurality of pixel portions are arranged along a column direction and a row direction corresponding to the sub scanning direction and a main scanning direction orthogonal to the sub scanning direction respectively, at least the column direction being inclined with respect to the sub scanning direction by a predetermined inclining-angle, the inclining-angle is set in accordance with a scanning density of the light beam in the main scanning direction the surface to be scanned, and the inclining-angle is set such that the light beams modulated by a plurality of the pixel portions are scanned on the same position on the surface to be scanned.

16. The display device of claim 15, wherein the spatial light modulation element itself is inclined with respect to the sub scanning direction by the predetermined inclining angle.

17. The display device of claim 15, wherein in the spatial light modulation element, the plurality of the pixel portions are arranged such that each of pixel lines, each having pixel portions arranged along the row direction, is shifted in the row direction by a predetermined pitch.

18. The display device of claim 1 further comprising:

an image control section which generates image signals of N types, N being integer more than or equal to two, corresponding respectively to N different displayed regions along the sub scanning direction in the surface to be scanned of the image display body, and controls respectively light modulated states of N spatial light modulation elements in accordance with the image signals of N types, wherein the light beams emitted from the light source sections are respectively irradiated to the N spatial light modulation elements, a set of N light beams modulated respectively by the N spatial light modulation elements is deflected in the sub scanning direction by the scanning section, and the N displayed regions on the surface to be scanned are scanned respectively by the set of N light beams at the same time.

19. The display device of claim 1 further comprising:

an image control section which generates line image signals of M types, M being integer more than or equal to two, corresponding respectively to M main scanning lines arranged along the sub scanning direction, the main scanning lines forming the displayed image displayed on the surface to be scanned of the image display body, and controls respectively light modulated states of pixel portions arranged along the main scanning direction in the M spatial light modulation elements in accordance with the line image signals of M types with a modulating period T which is obtained by a modulating period $T_L$ of the main scanning line being multiplied by M, wherein the light beams emitted from the light source sections in a strobo-emission manner in synchronization with the modulating period T are respectively irradiated to the M spatial light modulation elements successively, a set of the light beams modulated successively by the M spatial light modulation elements is deflected in the sub scanning direction by the scanning section, and the surface to be scanned of the image display body is scanned by the set of the light beams.

* * * * *